United States Patent
Islam et al.

(10) Patent No.: US 10,581,143 B2
(45) Date of Patent: Mar. 3, 2020

(54) METHOD AND APPARATUS FOR DETECTING OBJECT POSITION RELATIVE TO ANTENNA ARRAYS OF AN ELECTRONIC COMMUNICATION DEVICE

(71) Applicant: MOTOROLA MOBILITY LLC, Chicago, IL (US)

(72) Inventors: Md Rashidul Islam, Lombard, IL (US); Mohammed Abdul-Gaffoor, Palatine, IL (US); Eric L. Krenz, Crystal Lake, IL (US); Hugh K. Smith, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 683 days.

(21) Appl. No.: 15/176,536

(22) Filed: Jun. 8, 2016

(65) Prior Publication Data
US 2017/0356980 A1      Dec. 14, 2017

(51) Int. Cl.
*H01Q 1/24*     (2006.01)
*H01Q 3/24*     (2006.01)
*H04B 1/38*     (2015.01)
*H01Q 3/26*     (2006.01)
*H04B 1/3827*   (2015.01)

(52) U.S. Cl.
CPC ............ *H01Q 1/245* (2013.01); *H01Q 1/243* (2013.01); *H01Q 3/24* (2013.01); *H04B 1/3838* (2013.01); *H01Q 3/267* (2013.01)

(58) Field of Classification Search
CPC .......... H01Q 1/245; H01Q 1/243; H01Q 3/24; H01Q 21/28; H01Q 3/267; G01S 5/0284; H04B 1/3838
See application file for complete search history.

(56) References Cited

U.S. PATENT DOCUMENTS

| 8,159,399 B2 * | 4/2012 | Dorsey ................ H01Q 1/2266 343/702 |
| 8,738,093 B1 | 5/2014 | Gopalakrishnan et al. |
| 8,781,420 B2 * | 7/2014 | Schlub .................. H01Q 1/243 455/127.2 |
| 8,798,695 B1 | 8/2014 | Zheng et al. |

(Continued)

OTHER PUBLICATIONS

Azremi, A.A.H. et al. "Multi-antenna mobile terminal diversity performance in proximity to human hands under different propagation environment conditions", Browse Journals & Mazazines, Electronic Letters, vol. 47, Issue 22, pp. 1214-1215.

(Continued)

*Primary Examiner* — Cassi J Galt
(74) *Attorney, Agent, or Firm* — Cygan Law Offices P.C.

(57) ABSTRACT

An electronic communication device performs a method to detect proximity of an object to the device. The method includes determining a set of mutual coupling values for at least one pair of a plurality of antennas arrays of the electronic communication device. Each mutual coupling value indicates an efficiency of a mutual coupling transmission between an antenna element of a first antenna array of a pair of antenna arrays and an antenna element of a second antenna array of the pair of antenna arrays. The method further includes determining object position relative to the plurality of antenna arrays based on the set of mutual coupling values.

20 Claims, 18 Drawing Sheets

(56) References Cited

U.S. PATENT DOCUMENTS

| | | | |
|---|---|---|---|
| 9,705,611 B1* | 7/2017 | West | H04B 17/12 |
| 2009/0084612 A1 | 4/2009 | Mattice et al. | |
| 2010/0267421 A1 | 10/2010 | Rofougaran | |
| 2012/0190398 A1 | 7/2012 | Leukkuenen | |
| 2012/0315847 A1 | 12/2012 | Li et al. | |
| 2013/0157564 A1 | 6/2013 | Curtis et al. | |
| 2013/0301693 A1 | 11/2013 | Toksvig et al. | |
| 2013/0324056 A1 | 12/2013 | Maguire | |
| 2014/0071008 A1 | 3/2014 | Desclos et al. | |
| 2014/0128032 A1 | 5/2014 | Muthukumar | |
| 2014/0335916 A1 | 11/2014 | Thorson et al. | |
| 2015/0201385 A1 | 7/2015 | Mercer et al. | |
| 2015/0382307 A1 | 12/2015 | Harper et al. | |
| 2016/0077639 A1 | 3/2016 | Leek | |
| 2017/0290011 A1* | 10/2017 | Kushnir | G01S 7/006 |

OTHER PUBLICATIONS

Zhao, Chen et al.: "SideSwipe: Detecting In-air Gestures Around Mobile Devices Using Actual GSM Signals", Proceeding UIST '14, Proceedings of the 27th Annual ACM Symposium on User Interface Software and Technology, pp. 527-534.

Combined Search and Examination Report, dated Nov. 14, 2017, in UK Application No. GB1708949.1.

* cited by examiner

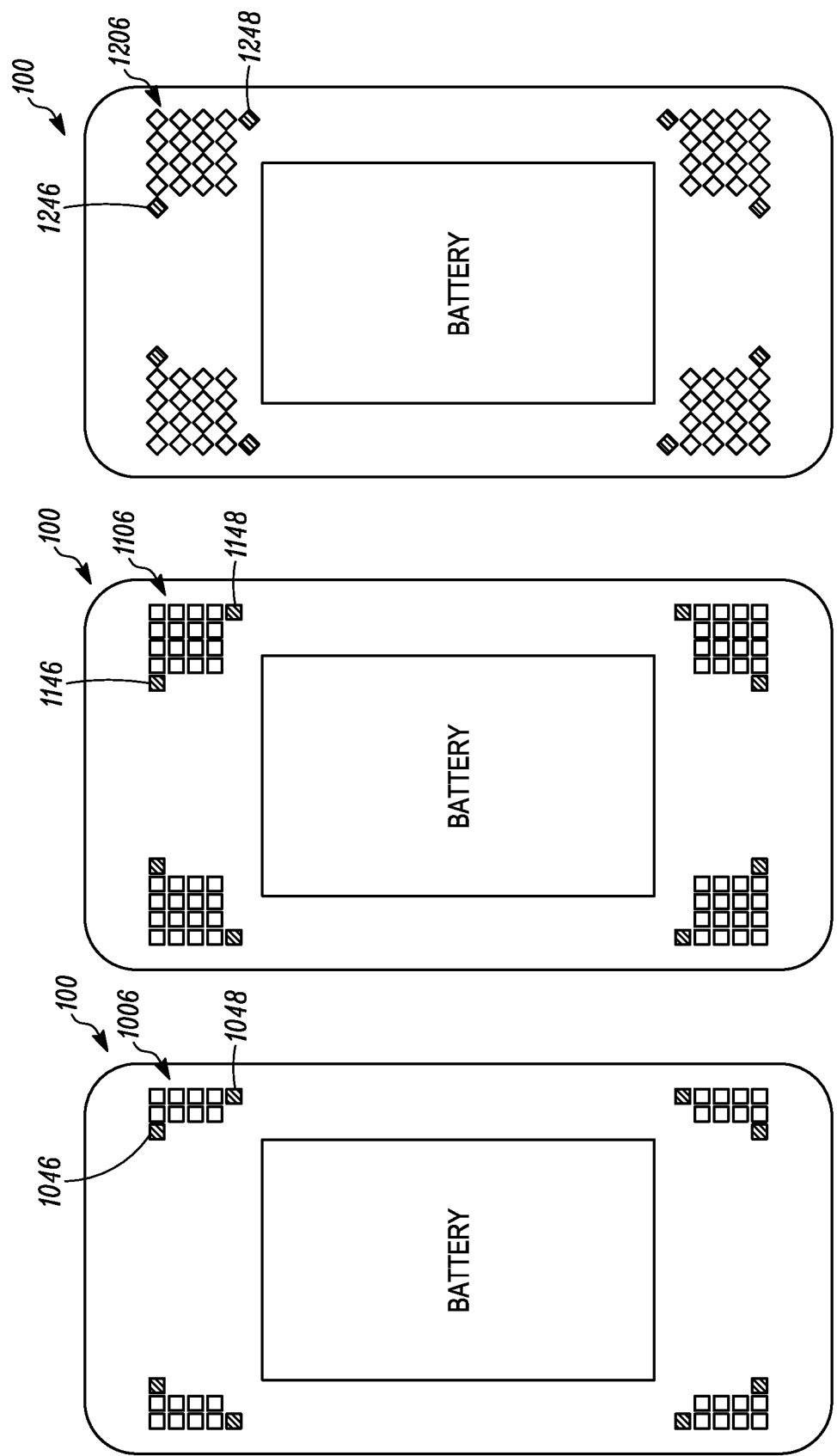

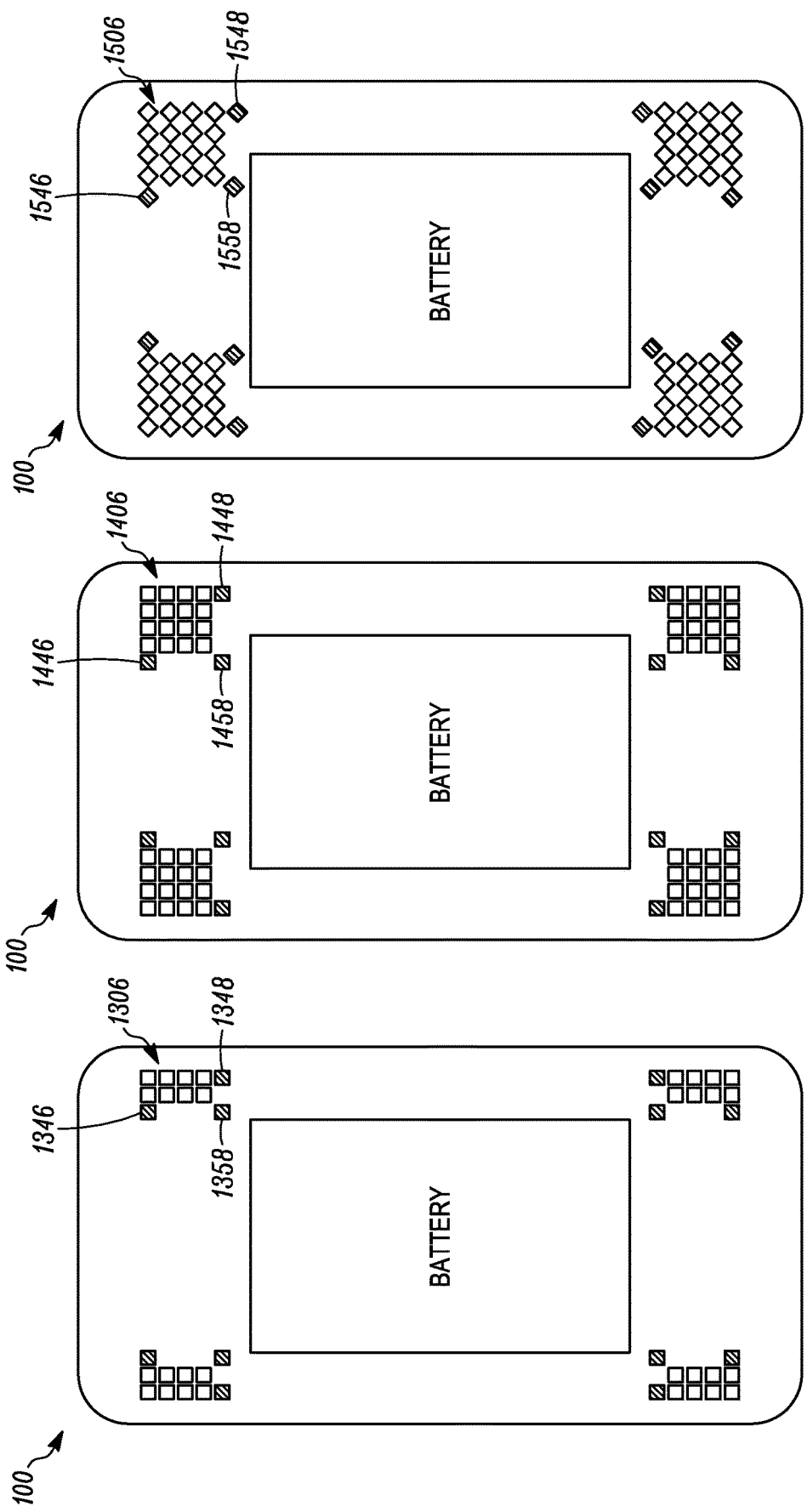

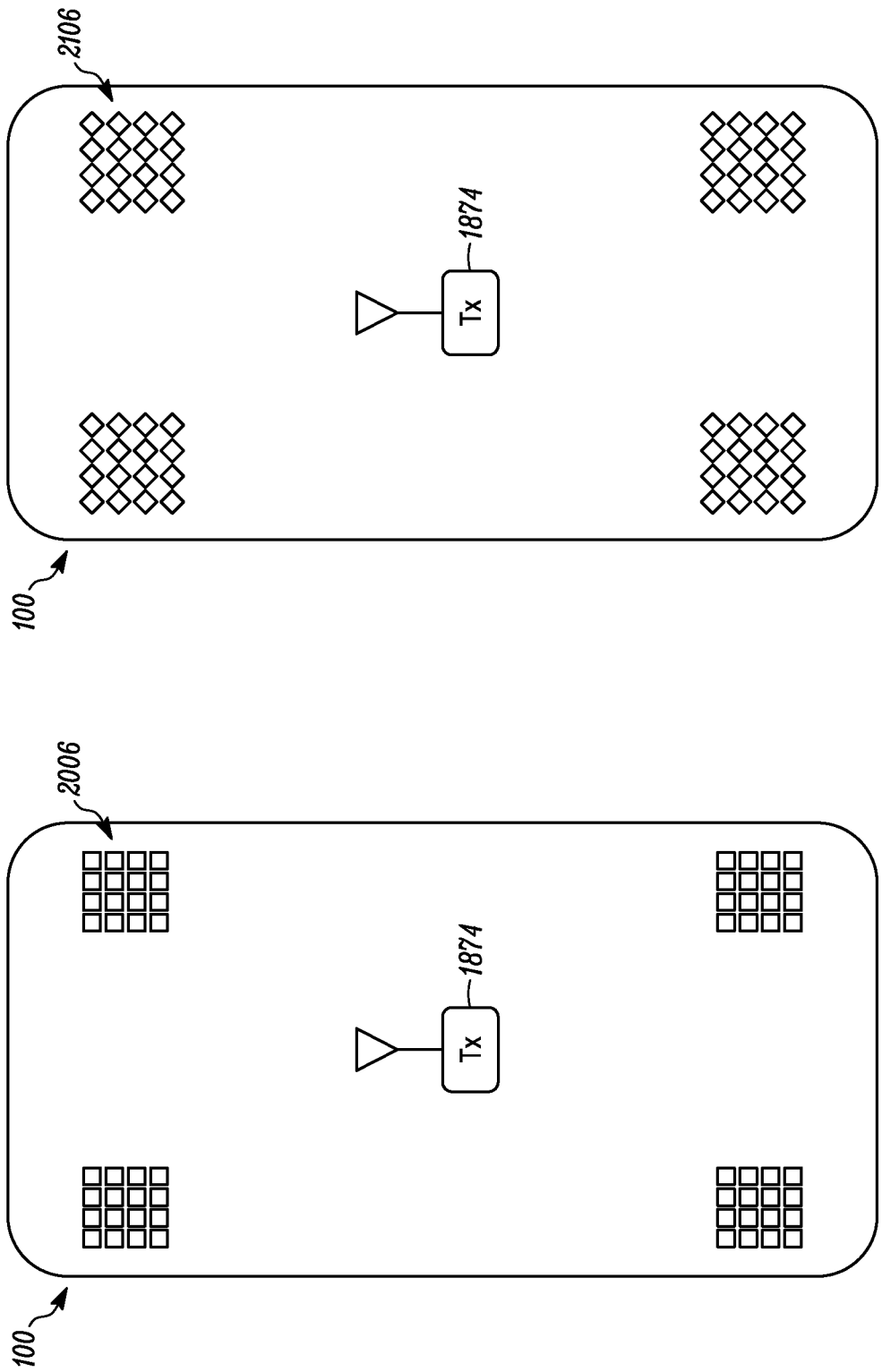

METHOD AND APPARATUS FOR DETECTING OBJECT POSITION RELATIVE TO ANTENNA ARRAYS OF AN ELECTRONIC COMMUNICATION DEVICE

FIELD OF THE DISCLOSURE

The present disclosure relates generally to detecting object position and more particularly to determining mutual coupling values for at least one pair of antenna arrays of an electronic communication device to detect object position relative to the antenna arrays.

BACKGROUND

Fifth Generation ("5G") mobile communications depend on millimeter-wave frequencies (e.g., >24 GHz). To realize an antenna gain sufficient to maintain a reliable communication link, for instance with a base station, electronic communication devices will likely need a much higher number of antenna elements positioned in various areas of the electronic communication device for diversity and multiple-input multiple-output (MIMO) applications. One concern with communications at millimeter-wave frequencies is that human tissues, such as skin, bone, muscle, and fat, are very lossy. For example, hand absorption can reduce peak gain of a millimeter-wave antenna array by 12 dB when the hand is around 5 millimeters from the antenna array. Accordingly, power savings can be realized if antenna arrays that are blocked by lossy objects are not used for high-power communications. Additionally, some regulatory entities require that exposure of the human body to radio frequency ("RF") energy be limited.

Conventionally, various sensors such as capacitive, touch, and infrared (top hat) proximity sensors have been used for hand detection to avoid using antenna elements that are blocked. However, due to the increase in antenna elements needed for communicating at millimeter-wave frequencies, the number of sensors needed for accurate hand detection would be impractical from control, management, power consumption, and cost perspectives.

BRIEF DESCRIPTION OF THE FIGURES

The accompanying figures, where like reference numerals refer to identical or functionally similar elements throughout the separate views, form part of the specification and illustrate embodiments in accordance with the included claims.

FIG. 10 shows a configuration of antenna elements within antenna arrays, in accordance with some embodiments.

FIG. 11 shows a configuration of antenna elements within antenna arrays, in accordance with some embodiments.

FIG. 12 shows a configuration of antenna elements within antenna arrays, in accordance with some embodiments.

FIG. 13 shows a configuration of antenna elements within antenna arrays, in accordance with some embodiments.

FIG. 14 shows a configuration of antenna elements within antenna arrays, in accordance with some embodiments.

FIG. 15 shows a configuration of antenna elements within antenna arrays, in accordance with some embodiments.

FIG. 20 shows a configuration of antenna elements within antenna arrays, in accordance with some embodiments.

FIG. 21 shows a configuration of antenna elements within antenna arrays, in accordance with some embodiments.

Figure 1:
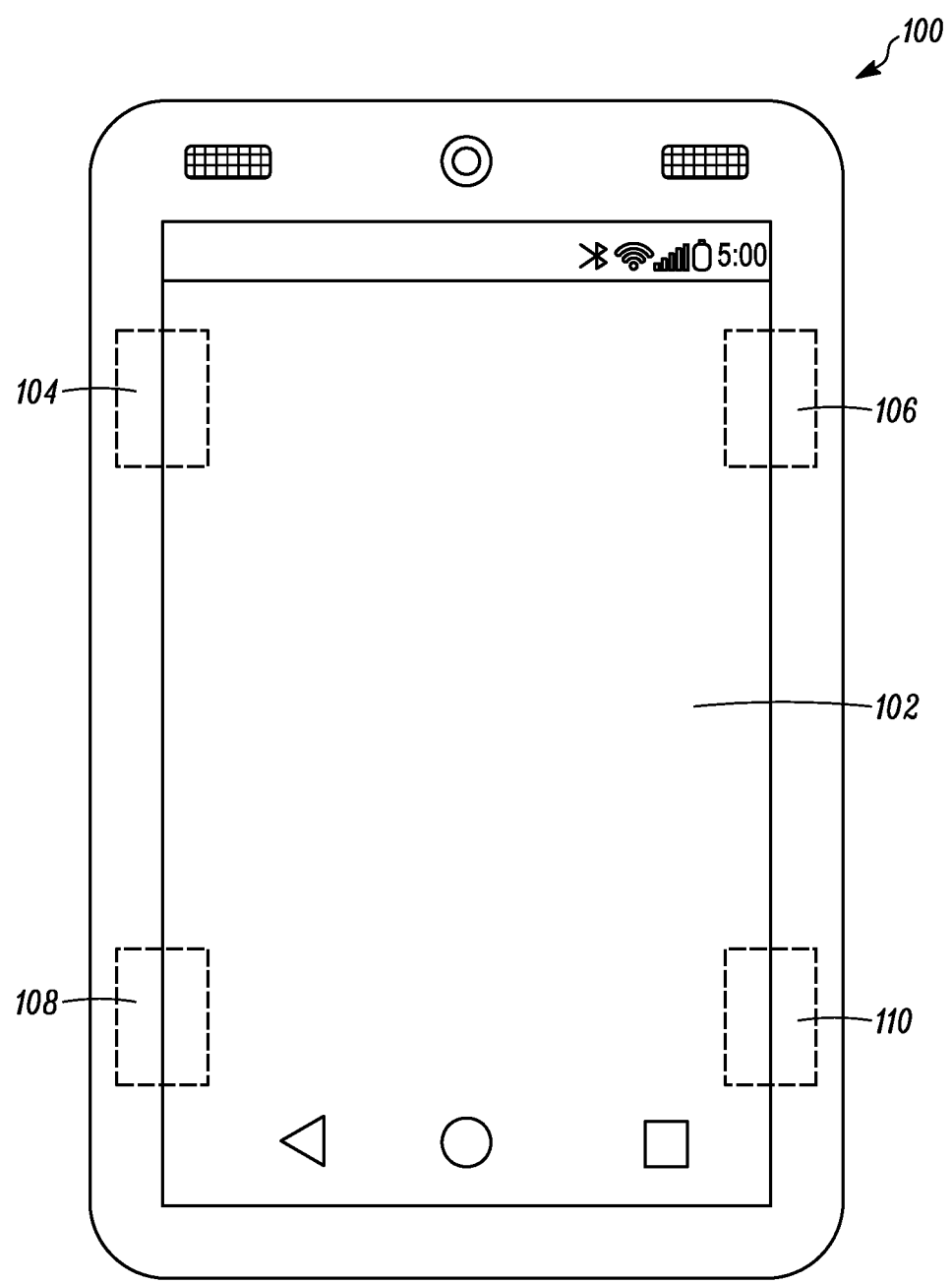
FIG. 1 shows an electronic communication device, in accordance with some embodiments.

Skilled artisans will appreciate that elements in the figures are illustrated for simplicity and clarity and have not necessarily been drawn to scale. For example, the dimensions of some elements in the figures may be exaggerated relative to other elements to help improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

Apparatus, device and/or method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides an electronic communication device and methods for determining object position relative to a plurality of antenna arrays included in the electronic communication device. Determining object position is based on determining mutual coupling values ("MCVs") for pairs of the antenna arrays. An object's proximity to an antenna array generally affects one or more MCVs for one or more pair of antenna arrays. An object can be any object that interferes with transmissions. An MCV is a quantitative measure of signal strength, or more specifically, how much of a signal transmitted by a transmitting antenna element is received by a receiving antenna element. Accordingly, an MCV can indicate an efficiency of a signal transmitted, also referred to herein as a transmission, between antenna elements of a pair of antenna arrays.

MCVs can be determined using low-power transmissions between antenna elements of antenna arrays to facilitate mutual coupling between the antenna elements. Such transmissions between antenna elements internal to an electronic communication device are referred to herein as "mutual coupling" transmissions. Mutual coupling describes, for instance, electromagnetic energy absorbed or received by an antenna element of one antenna array as a consequence of electromagnetic energy sent or transmitted by an antenna element of another antenna array. For an embodiment, low-power transmissions include transmissions at power levels of −20 dBm and lower. For one example, the low-power transmissions are facilitated using a short-range communication technology such as near-field communication (NFC). Alternatively, higher power transmissions can be used to determine some or all of the MCVs.

For a particular embodiment described herein, the MCVs are determined using the low-power transmissions. However, high-power transmissions, e.g., using power levels of 0 dBm (1 mW) or higher, are used for "communication" transmissions. Communication transmissions are used to communicate information, e.g., data and/or control information, to external devices such as external electronic communication devices and base stations.

For the embodiments described, the MCVs which are determined are scattering parameters, referred to herein as S-parameters. S-parameters describe an input-output relationship between ports or terminals in an electrical system, wherein a port is where a voltage or current can be delivered. In particular, S-parameters represent power transferred between a pair of ports, e.g., a pair of antenna elements, and can be determined from power level measurements. In general, for two ports, e.g., N and M, $S_{NM}$ represents power transferred from port M to port N. Accordingly, for ports 1 and 2, $S_{12}$ represents the power transferred from port 2 to port 1, and $S_{21}$ represents the power transferred from port 1 to port 2.

Although applicable at any frequency, S-parameters are used in the described calculations, since signal power is more easily quantifiable than currents or voltages for electronic communication devices operating at RF. However, for other embodiments, other types of MCVs can be utilized including, but not limited to, Y-parameters, Z-parameters, T-parameters, or ABCD-parameters, some of which can be converted to S-parameters.

FIG. 1 shows an electronic communication device (or simply device) 100, illustrated as a portable smartphone, which is referred to in describing included embodiments. Although a smartphone is illustrated, the device 100 can represent other types of portable devices, such as a cellular phone, a phablet, a tablet, a personal digital assistant, a mobile phone, a media player, a laptop, or another type of portable device capable of detecting object position using MCVs, according to the disclosed embodiments. The smartphone 100 includes a display 102 and four antenna arrays 104, 106, 108, 110 located near the four corners of the smartphone 100. However, other embodiments of the smartphone 100 can include more or fewer antenna arrays in different spatial configurations. Moreover, the antenna arrays 104, 106, 108, 110 can be located inside, embedded within, or placed on a housing of the smartphone 100.

Figure 2:
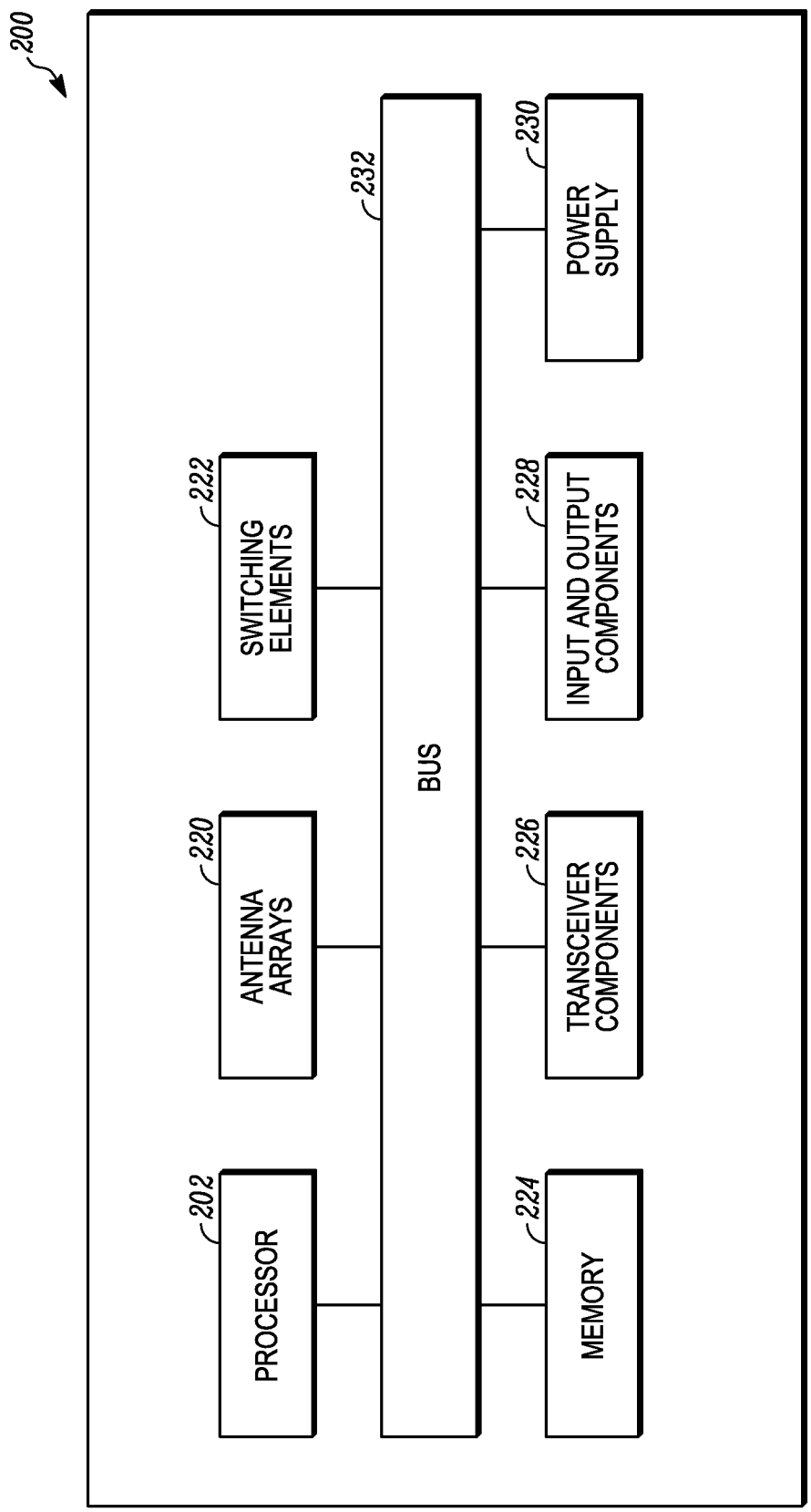
FIG. 2 shows a block diagram of an electronic communication device including components configured in accordance with some embodiments.

FIG. 2 shows a block diagram of an electronic communication device 200 configured to determine object position, relative to a plurality of antenna arrays, based on a set of one or more MCVs. For described embodiments, the device 200 is taken to be the smartphone 100. Included within the device 200 is a processor 202, a plurality of antenna arrays 220, a plurality of switching elements 222, memory 224, one or more transceiver components 226, input and output components 228, and a power supply 230. Hardware components 202, 220, 222, 224, 226, 228, and 230 are operationally interconnected by internal communication links 232, such as a communication bus.

A limited number of components 202, 220, 222, 224, 226, 228, 230, 232 are shown within the device 200 for ease of illustration. Other embodiments may include a fewer or greater number of components 202, 220, 222, 224, 226, 228, 230, 232 within the device 200. Moreover, other components needed for a commercial embodiment of the device 200 are omitted from FIG. 2 for clarity in describing the enclosed embodiments.

In general, the processor 202 is configured with functionality in accordance with embodiments of the present disclosure as described herein with respect to the remaining figures. Such functionality is supported by the other hardware shown in FIG. 2, including the device components 220, 222, 224, 226, 228, and 230. "Configured," "adapted," "operative," or "capable," as used herein, means that indicated components are implemented using one or more hardware elements, such as one or more operatively coupled processing cores, memory elements, and interfaces, which may or may not be programmed with software and/or firmware, as the means for the indicated components to implement their desired functionality.

The processor 202 includes arithmetic logic and control circuitry necessary to perform the digital processing, in whole or in part, for the device 200 to determine object position relative to the antenna arrays 220 based on a set of MCVs. In some instances, the processor 202 also determines how to configure the antenna arrays 220 based on the detected object position. For one embodiment, the processor 202 represents a primary microprocessor, also referred to as a central processing unit ("CPU"), of the device 200. For example, the processor 202 can represent an application processor of the smartphone 100. In another embodiment, the processor 202 is an ancillary processor, separate from the CPU, wherein the ancillary processor is dedicated to providing the processing capability, in whole or in part, needed for the components of the device 200 to perform at least some of their intended functionality.

For an example, the processor 202 can be configured through executing algorithms consistent with one or more of the methods illustrated by the logical flow diagrams shown in FIGS. 3, 4, 5, 16, 17, 22, and 23 and the accompanying description. In general, the processor 202 is operatively coupled to multiple of the antenna arrays 220 and determines, from mutual coupling transmissions between one or more pair of the multiple antenna arrays 220, a set of MCVs. Each MCV indicates an efficiency of a mutual coupling transmission between an antenna element of a first antenna array of a pair of antenna arrays and an antenna element of a second antenna array of the pair of antenna arrays. The processor also determines object position relative to the multiple antenna arrays 220 based on the set of MCVs.

In some instances, the processor 202 determines which antenna arrays and/or antenna elements communicate using low-power transmissions for mutual coupling within the device 100. More particularly, based upon the mutual coupling results and a resulting determination of which antenna arrays, antenna sub-arrays, and/or antenna elements are blocked or shadowed, the processor 202 can dynamically determine whether and which antenna arrays, antenna sub-arrays, and/or antenna elements are: deactivated (e.g., turned off) for purposes of exchanging (meaning transmitting, receiving, or both) communication transmissions with an external device; used for mutual coupling transmissions (receive only, transmit only, or both receive and transmit) between one or more pairs of internal antenna arrays; and/or used for communication transmissions with one or more external devices.

Each antenna array of the plurality of antenna arrays 220 includes one or more "active" or "driven" antenna elements that are configured, by being constructed for instance with a suitable metallic conductor material and coupled to a transceiver, to radiate and/or receive electromagnetic energy. Electromagnetic energy is also referred to herein as electromagnetic transmissions or simply transmissions. An active antenna element radiates and/or receives transmissions to communicate data and/or to detect object position using MCVs, according to the described teachings. In other words, each antenna array of the plurality of antenna arrays 220 includes one or more active antenna elements that exchange transmissions, such as mutual coupling transmissions or communication transmissions, with another antenna array.

Some antenna elements can be used for both mutual coupling transmissions and communication transmissions. Some antenna elements can be dedicated for, meaning used only for, mutual coupling transmissions. Some antenna elements can be dedicated for communicating data external to the electronic communication device. For an example, at least some of the antenna elements, for instance for communications at millimeter-wave frequencies, are patch antenna elements, also known as rectangular microstrip antenna elements.

The antenna elements of a particular antenna array can be operated independently for high- and/or low-power transmissions or can be collectively operated, such as for MIMO and beamforming. For one example, all of the multiple antenna elements of an antenna array are concurrently operated to radiate and/or receive transmissions. For another example, only some of the multiple antenna elements of an antenna array (referred to herein as an antenna sub-array or simply a sub-array) are concurrently operated to radiate and/or receive transmissions. For still another example, a single antenna element of an antenna array is operated to radiate and/or receive transmissions. Accordingly, the phrase "operating an antenna array" or equivalents thereof covers all three of these examples.

For a particular embodiment, one or more of the antenna arrays 220 are used to communicate data, such as voice or video, in multiple Wi-Fi and/or Wireless Gigabit Alliance (WiGig) frequency bands including, but not limited to, 2.4 GHz, 3.65 GHz, 4.9 GHz, 5 GHz, 5.9 GHz, and 60 GHz (e.g., for WiGig). An example benefit of the present teachings is that one or more antenna arrays 220 that are included in the device 200 for high-power transmissions can also be used for low-power transmissions to determine MCVs for detecting object position. This can reduce or eliminate the need for additional sensors such as capacitive, top hat, and/or touch sensors to detect object position relative to the device 200.

Those antenna arrays 220 having one or more antenna elements used and operated to send and/or receive transmissions over or using millimeter-wave frequencies or frequency bands are referred to herein as millimeter-wave antenna arrays. Those antenna arrays 220 having one or more antenna elements used and operated to send and/or receive transmissions over or using centimeter-wave frequencies or frequency bands are referred to herein as centimeter-wave antenna arrays.

For another embodiment, at least some of the antenna arrays 220 are used to implement MIMO and for beemsteering, e.g., beamforming, to shape and direct electromagnetic energy toward an external device. For instance, at least some of the antenna arrays 220 are phased arrays. Accordingly, relative phases of the respective signals feeding the antenna elements are set, either fixedly or dynamically, in such a way that the effective radiation pattern of the antenna array is reinforced in a desired direction and suppressed in undesired directions.

For other embodiments, one or more of the antenna arrays 220 are configured to radiate and receive electromagnetic energy to communicate data over sub-6 GHz frequency bands for second generation ("2G"), third generation ("3G"), and/or fourth generation ("4G") technologies, for instance. Example sub-6 GHz frequency bands include, but are not limited to, 700 MHz, 850 MHz, 900 MHz, 1700 MHz to 2200 MHz, and 2300 MHz to 2700 MHz. Those antenna arrays having one or more antenna elements used and operated to send and/or receive transmissions over or using under 6 GHz (i.e., sub-6 GHz) frequencies or frequency bands are referred to herein as sub-6 GHz antenna arrays.

Additionally, at least one antenna array of the multiple antenna arrays 220 can include one or more "passive" or "parasitic" antenna element that is not electrically coupled to a transceiver. The parasitic antenna elements can be strategically located to increase the mutual coupling sensitivity between a pair of active antenna elements, for instance without impacting communications with external electronic communication devices. Beneficially, a parasitic antenna element in one antenna array of a pair of antenna arrays can increase reception sensitivity of an adjacent active antenna element. A parasitic antenna element in another antenna array of the pair of antenna arrays can shape the mutual coupling transmission of an adjacent active antenna element. This allows mutual coupling transmissions to be sent at a lower power and with more directionality toward the receiving antenna element. For an example, at least some of the parasitic antenna elements are patch/microstrip antenna elements.

The transceiver components 226 represent one or more transceivers, each having transmitter hardware (a transmitter portion) and receiver hardware (a receiver portion). The transmitter portion provides signals to at least one of the antenna arrays 220 for radiation or transmission to another antenna array within or external to the device 200. The receiver portion receives signals from at least one of the antenna arrays 220, which were detected from transmissions within or external to the device 200, for further processing by the device 200. Alternatively, the transmitter and receiver are separate hardware elements. Moreover, for some embodiments, for instance where a particular antenna array is dedicated for mutual coupling transmissions, one or more antenna elements may be coupled only to a transmitter.

For an embodiment, the processor 202 controls the strength, duration, waveform, and/or modulation of the signals provided by the one or more transceivers 226 and controls demodulation of the signals received by the one or more transceivers 226. Moreover, for one example, a transceiver 226 (or a constituent transmitter or receiver portion) is turned on when all of the components needed to perform its functionality, e.g., front end circuitry, demodulation circuitry, switch position, provision of power or voltage, processing capabilities, are operative or activated. Similarly, a transceiver 226 (or a constituent transmitter or receiver portion) is turned off when one or more of the components needed to perform its functionality is inoperative or deactivated.

The transceiver components 226 include, for example, one or more wireless local area network (WLAN) transceivers that enable the device 200 to access the Internet using standards such as Wi-Fi or WiGig. The WLAN transceivers enable the electronic communication device 200 to send and receive radio signals to and from similarly equipped devices using a wireless distribution method, such as a spread-spectrum or orthogonal frequency-division multiplexing (OFDM) method. For some embodiments, the WLAN transceivers use an Institute of Electrical and Electronics Engineering (IEEE) 802.11 (e.g., a, b, g, n, ac, or ad) standard to communicate with other devices in the 2.4 GHz, 3.65 GHz, 4.9 GHz, 5 GHz, 5.9 GHz, and 60 GHz frequency bands.

For other embodiments, the transceiver components 226 include one or more cellular transceivers to support communication transmissions. For example, the cellular transceiver enables the device 200 to engage in information exchange sessions, such as calls or message exchange sessions, with other electronic communication devices using one or more cellular networks. Cellular networks can use any wireless technology that, for example, enables broadband and Internet Protocol (IP) communications including, but not limited to: 3G wireless technologies such as CDMA2000 and Universal Mobile Telecommunications System ("UMTS") networks; 4G technologies such as Long-Term Evolution (LTE) and WiMAX; or 5G technologies.

The set of one or more switching elements or simply switches 222 operatively couples the plurality of antenna arrays 220 to the transceiver components 226. For a particular embodiment, each antenna element of each antenna array 220 is coupled to a separate transceiver component 226 using a separate one of the switching elements 222. For a particular implementation, each antenna element has coupled thereto at least its own power amplifier and low-noise amplifier. For another embodiment, multiple antenna elements, antenna sub-arrays, and/or antenna arrays are coupled to the same transceiver component 226 using one or more switching elements 222.

For one example, the switching elements 222 include a plurality of single-pole double-throw (SPDT) switches. For this embodiment, the common terminal is coupled to an antenna element of an antenna array 220, and the two other terminals are coupled respectively to the transmitter and receiver portions of a transceiver 226. Accordingly, an antenna element can be switched to "transmitting mode" by a controller, e.g., the processor 202, causing the switch's common terminal to connect to the switch's terminal that is coupled to the transmitter portion. The transmitting mode can be for low-power transmissions, high-power transmissions, or both. Similarly, an antenna element can be switched to "receiving mode" by a controller causing the switch's common terminal to connect to the switch's terminal that is coupled to the receiver portion.

Additionally, an antenna element can be deactivated or turned off in this embodiment by, for instance, removing power from the switch 222. Likewise, an antenna array 220 with multiple antenna elements can be deactivated by removing power from the switches connected to all the antenna elements. In this manner, for some embodiments, deactivating an antenna array or a portion thereof, e.g., an antenna element or sub-array, means deactivating transmissions for that antenna array or antenna array portion. For other embodiments, for instance depending on the particular type of switch used, deactivating the antenna array or portion thereof means deactivating both transmissions and receptions for that antenna array or antenna array portion. This could include, for example, setting a switch coupled to the antenna array or antenna array portion to an off position.

The memory 224 provides storage for electronic data used by the processor 202 in performing its functionality. For example, the memory 224 stores MCVs determined for mutual coupling transmissions between antenna elements of pairs of the antenna arrays 220. In some instances, the memory 224 also stores reference coupling values. For an embodiment, the memory 224 represents random access memory ("RAM"). In other embodiments, the memory 224 represents volatile or non-volatile memory. For a particular embodiment, a portion of the memory 224 is removable. For example, the processor 202 can use RAM to cache data while it uses a micro secure digital ("microSD") card to store files associated with determining object position based on MCVs.

The input and the output components 228 represent user-interface components of the electronic communication device 200 configured to allow a person or persons to use, direct, program, or otherwise interact with the device 200. Examples of user-interface components include touch-screens, mechanical or electronic controls, and/or wireless and wired peripheral devices such as, keyboards, mice, and touchpads.

The power supply 230 represents a power source that supplies power to the device components 202, 220, 222, 224, 226, 228, and 232, as needed, during the course of their normal operation. Power is supplied to meet the individual voltage and load requirements of the device components 202, 220, 222, 224, 226, 228, and 232, that draw electric current. For some embodiments, the power supply 230 is a wired power supply that provides direct current from alternating current using a full- or a half-wave rectifier. For other embodiments, the power supply 230 is a battery that powers up and runs the device 200. For a particular embodiment, the power supply 230 is a rechargeable battery located within the device 200. The rechargeable battery for the device 200 is configured for temporary connection to another power source external to the device 200 to restore a charge to the rechargeable battery when the battery is depleted or less than fully charged. In another embodiment, the battery is simply replaced when it no longer holds sufficient charge.

Figure 3:
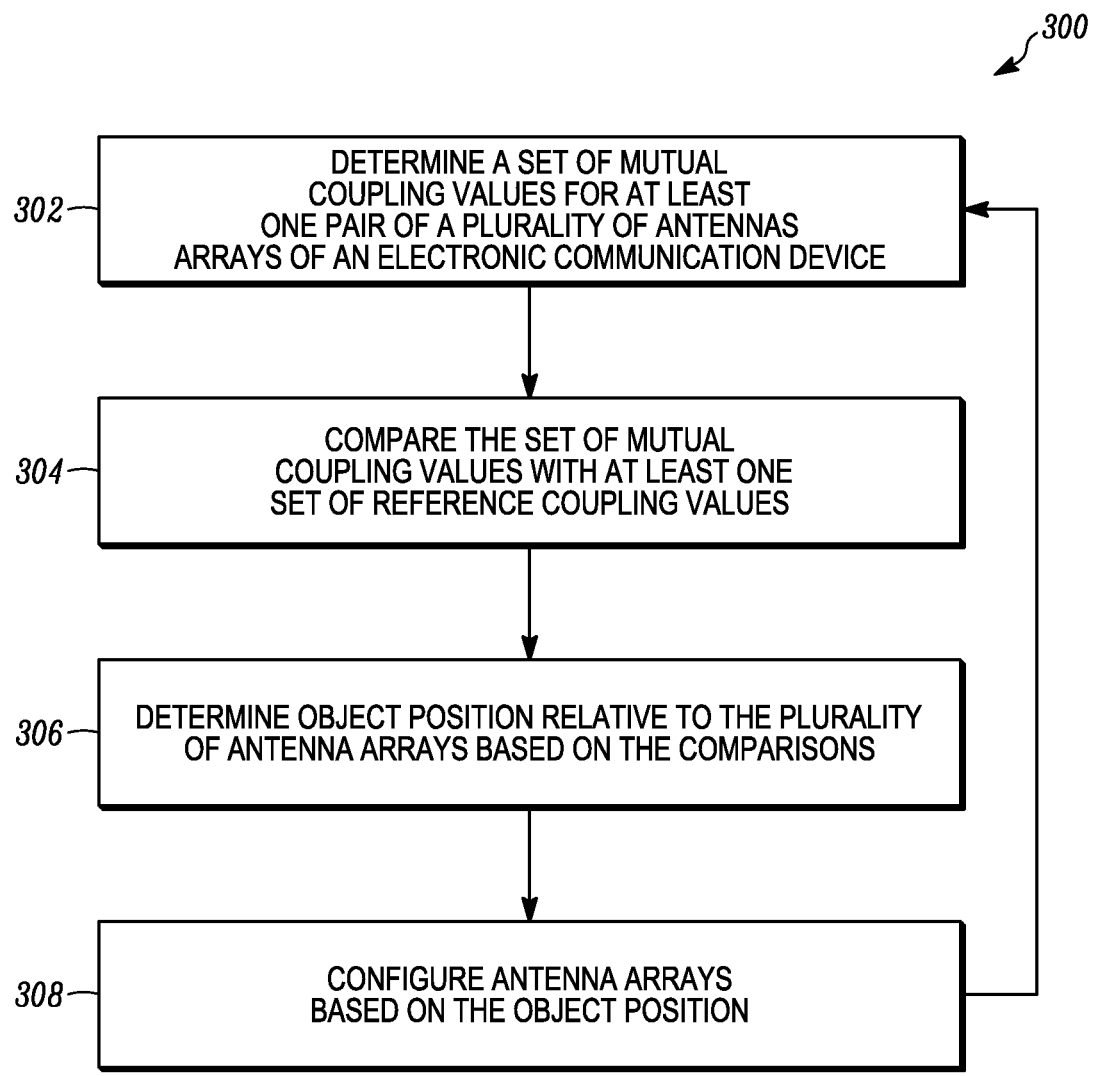
FIG. 3 shows a logical flow diagram illustrating a method for determining object position, in accordance with some embodiments.
Figure 5:
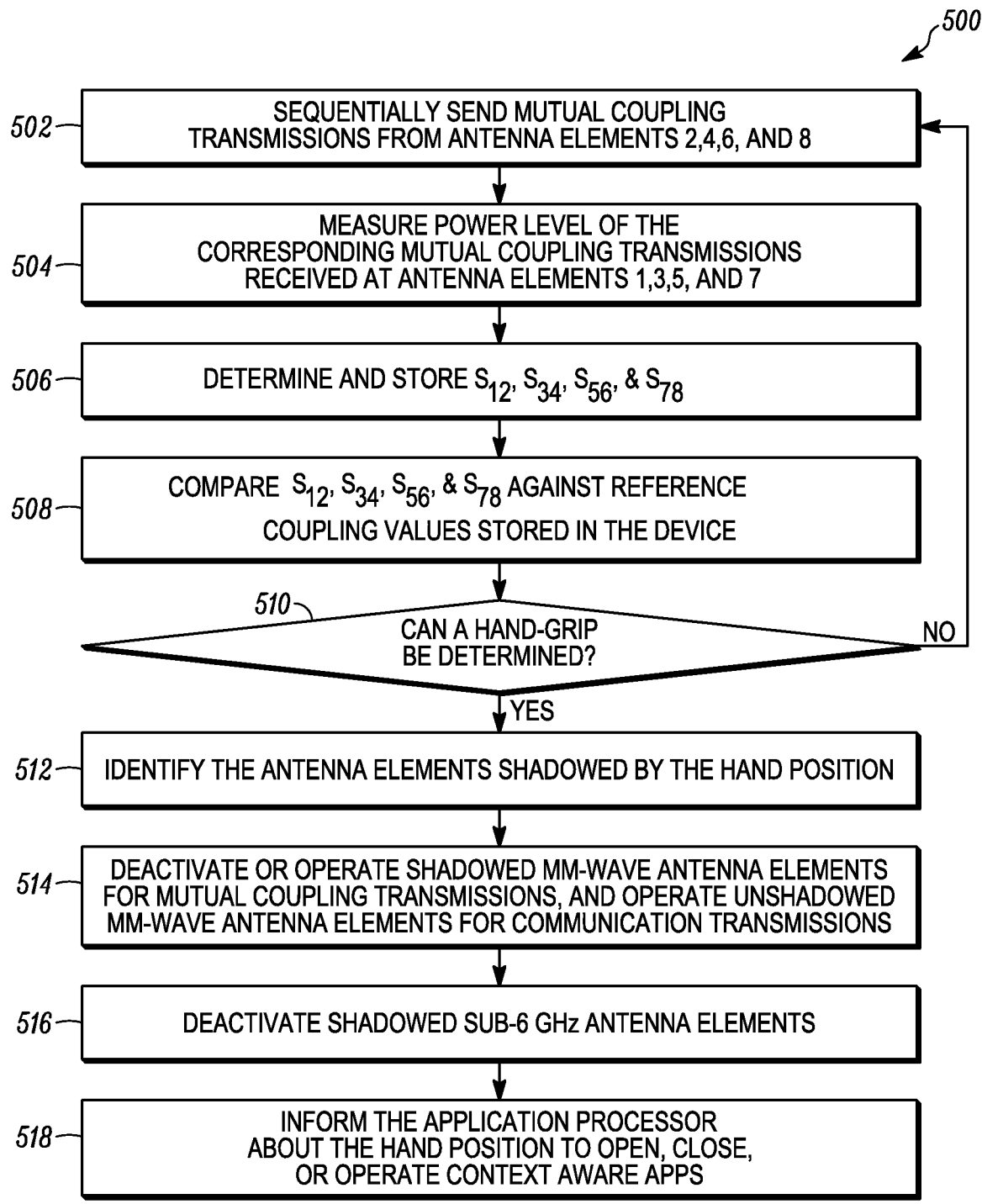
FIG. 5 shows a logical flow diagram illustrating a method for determining object position, in accordance with some embodiments.
Figure 16:
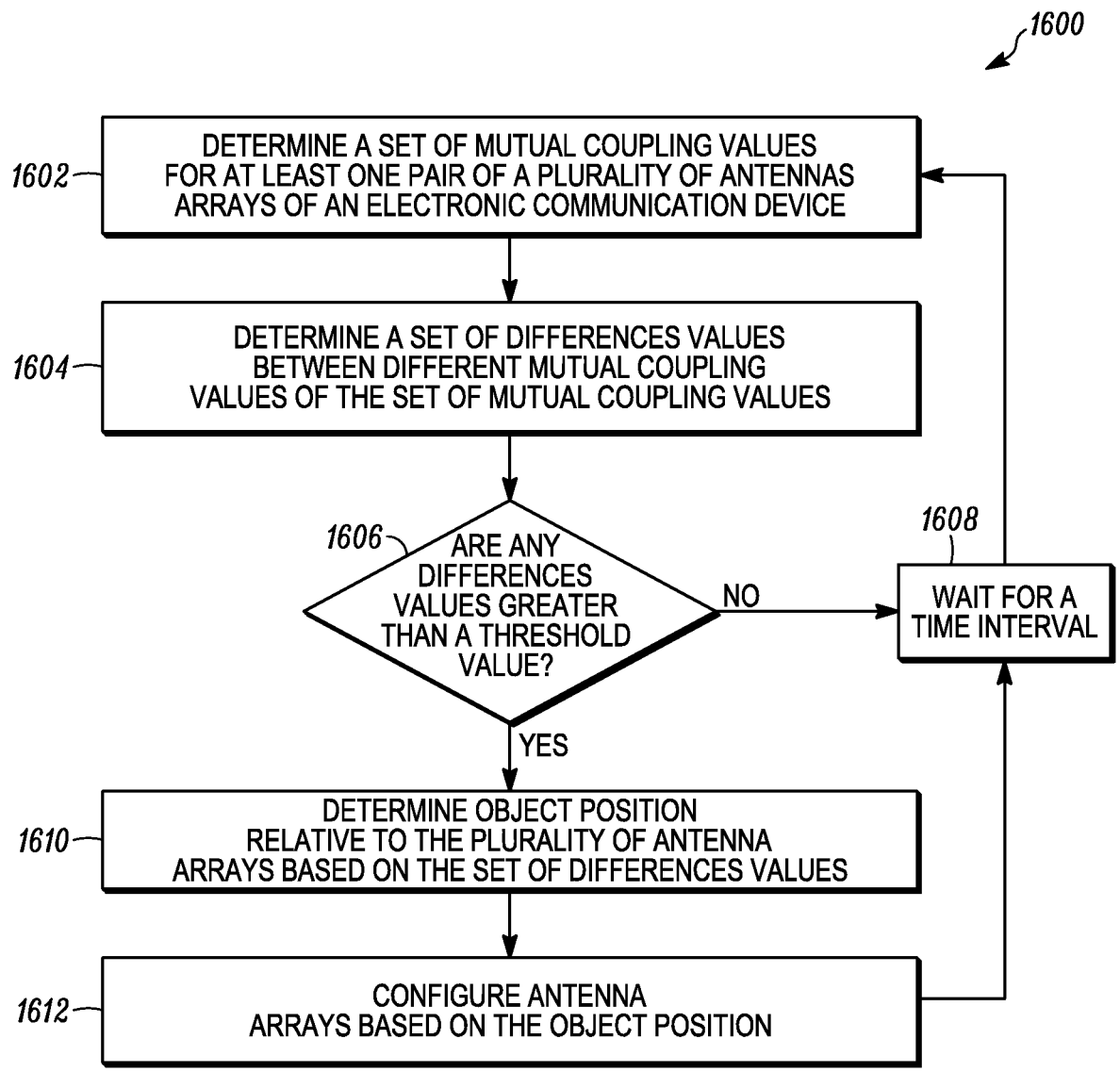
FIG. 16 shows a logical flow diagram illustrating a method for determining object position, in accordance with some embodiments.
Figure 17:
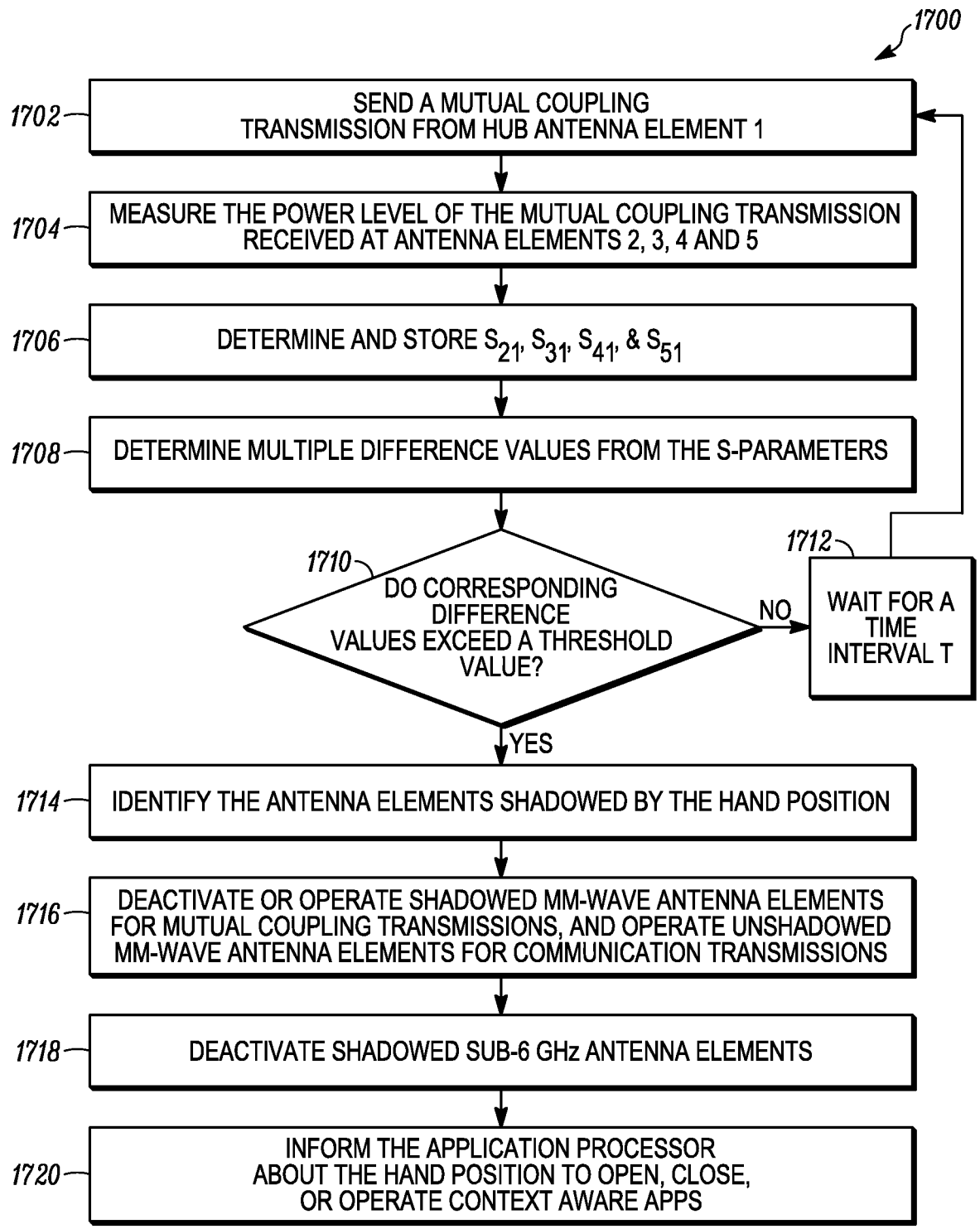
FIG. 17 shows a logical flow diagram illustrating a method for determining object position, in accordance with some embodiments.
Figure 22:
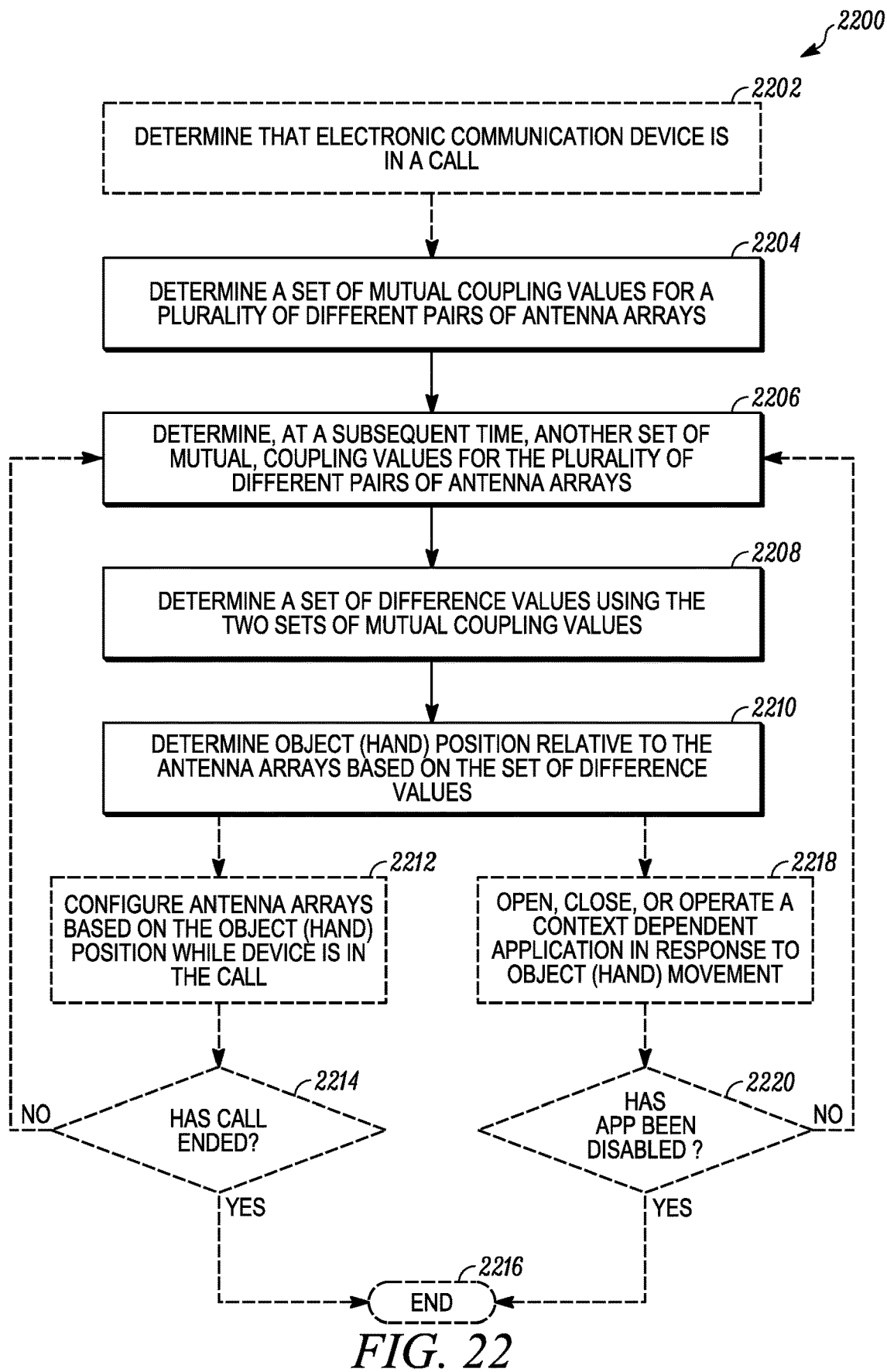
FIG. 22 shows a logical flow diagram illustrating a method for determining object position, in accordance with some embodiments.
Figure 23:
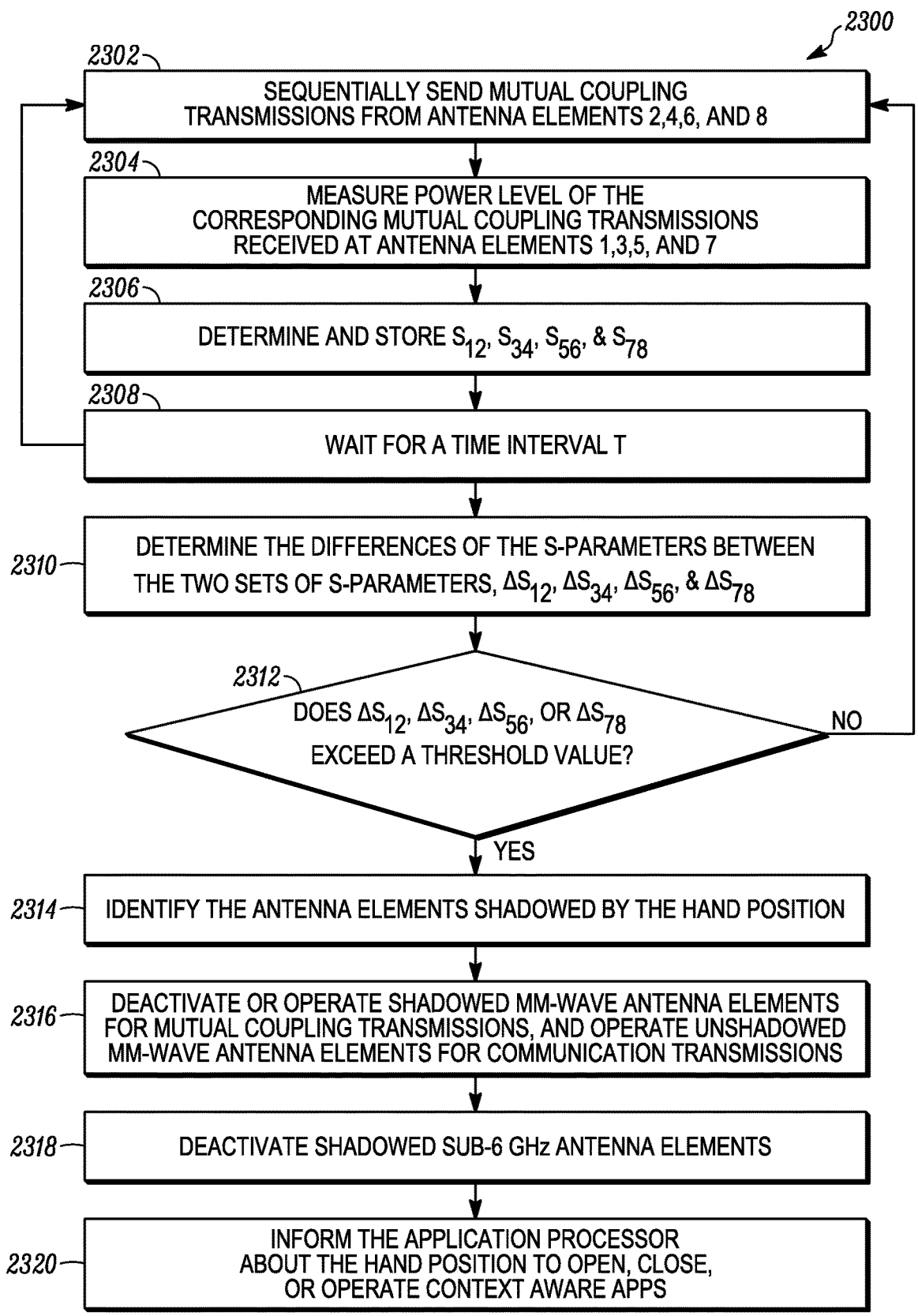
FIG. 23 shows a logical flow diagram illustrating a method for determining object position, in accordance with some embodiments.

In different embodiments, the smartphone 100 uses the components 202, 220, 222, 224, 226, 228, 230, 232 shown in FIG. 2 to determine object position using MCVs in different ways. Namely, FIGS. 3 and 5 illustrate methods for determining object position relative to a plurality of antenna arrays by comparing at least one set of MCVs to one or more sets of reference coupling values. For example, comparing a set of MCVs with a set of reference coupling values is used to determine a hand-grip relative to the electronic communication device. FIGS. 16 and 17 illustrate methods for determining object position based on taking differences between MCVs within a set of MCVs. For example, a plurality of difference values are determined each indicating a difference calculation between a different pair of MCVs of a set of MCVs. The plurality of difference values is used to determine the object position relative to the plurality of antenna arrays. Moreover, FIGS. 22 and 23 illustrate methods for determining object position, and also motion, based on how MCVs change over time, as determined by successive measurements.

For each embodiment, the method includes determining a set of MCVs for at least one pair of antenna arrays of a plurality of antennas arrays of an electronic communication device. Each MCV indicates an efficiency of a mutual coupling transmission between an antenna element of a first antenna array of a pair of antenna arrays and an antenna element of a second antenna array of the pair of antenna arrays. The method also includes determining object position relative to the plurality of antenna arrays based on the set of MCVs.

Moreover, for the described embodiments, determining the set of MCVs includes determining a plurality of S-parameters indicating power transferred for mutual coupling transmissions between antenna elements of multiple pairs of the plurality of antenna arrays. However, different types of MCVs can be determined for other embodiments. Additionally, the MCVs are determined from mutual coupling transmissions between antenna elements of pairs of antenna arrays having at least one millimeter-wave antenna array. However, any suitable types of antenna arrays can be used for exchanging mutual coupling transmissions from which MCVs can be calculated.

For a particular embodiment, an electronic communication device, such as the smartphone 100, can start at least some of the methods in accordance with the present teachings when a user begins to interact with the device 100, such as interacting with or over the touchscreen 102. The device 100 can then repeat MCV measurements over time to track the user's body part, e.g., the user's hand, movement relative to the device 100 until the user stops interacting with the device 100. For another embodiment, the electronic communication device 100 can start at least some of the methods in accordance with the present teachings at the start of an information exchange session, such as a voice or data call, with another device. Similarly, the device 100 can then repeat MCV measurements over time to track the user's body part, e.g., the user's hand, movement relative to the device 100 until the call ends.

FIG. 3 shows a logical flow diagram illustrating an embodiment of a method 300 for determining object position based on measured or calculated MCVs. An electronic communication device, such as the smartphone 100, determines 302 a set of MCVs for at least one pair of a plurality of antenna arrays, such as the antenna arrays 104, 106, 108, and 110. As stated, each MCV indicates the efficiency of a mutual coupling transmission between antenna elements of a pair of antenna arrays. For example, an MCV is or represents a signal reception level for a mutual coupling transmission between a pair of antenna elements, one from each antenna array of the pair of antenna arrays. The signal reception level can be, for instance: a signal reception, e.g., signal strength, measurement at a receiving antenna element; a ratio of the signal reception level at the receiving antenna element to a signal transmission level at a transmitting antenna element; a difference between the signal reception level at the receiving antenna element and the signal transmission level at the transmitting antenna element, etc.

For a particular example, the measured MCVs are S-parameters. For instance, at a given time, $t_1$, an antenna element of the antenna array 106 sends a mutual coupling transmission that is received by an antenna element of the antenna array 104. The processor 202 controls the receiver circuitry coupled to the receiving antenna element to determine reception level, from which the processor 202 determines an S-parameter, $S_{t1}$, ($S_{mn}$ at t1) of −32 dB, for the pair of antenna arrays 102, 104. For an embodiment, the S-parameter is a power level measurement for the mutual coupling transmission detected at the receiving antenna element. Additional S-parameters can be similarly determined for different pairs of the antenna arrays 104, 106, 108, 110 as part of a set of S-parameters. Where multiple S-parameters are determined during a given time frame, the set is referred to herein as an S-matrix.

The smartphone 100, e.g., using the processor 202, compares 304 the measured set of MCVs with at least one set of one or more reference coupling values and determines 306 object position relative to the plurality of antenna arrays, e.g., 104, 106, 108, 110, based on these comparisons. A reference coupling value is any suitable calculated and stored value that is related to one or more previously measured MCVs for a pair of antenna arrays and allows the device 100 to determine position of an object relative to the pair of antenna arrays. MCVs can be used to detect object position because the presence of a lossy object interferes with a mutual coupling transmission between antenna elements of a pair of antenna arrays. This interference impacts, e.g., lowers, the MCV for this pair of antenna arrays relative to a "free space" MCV measurement, which is the MCV measurement for the antenna array pair without the presence of the lossy object. Lossy objects can include a user's hand or hands as the user grips or holds the smartphone 100. In some instances, a lossy object can include the user's head when the user holds the smartphone 100 to the user's ear.

For an embodiment, a reference coupling value is determined based on two previously measured MCVs for a pair of antenna arrays. For a particular embodiment, the smartphone 100 determines and stores a first MCV for the pair of antenna arrays for a mutual coupling transmission sent in free space and a second MCV for the pair of antenna arrays for a mutual coupling transmission sent when a nearby lossy object interferes with the mutual coupling transmission. The device 100 can use one of the MCVs as the reference coupling value, $MCV_{ref}$, and determine a threshold value, $MCV_{th}$, from or using the other MCV. For instance, $MCV_{th}$ is based on the difference between the first and second MCVs. Both $MCV_{ref}$ and $MCV_{th}$ are used to determine object position relative to the pair of antenna arrays.

For example, the device 100 determines and stores at some earlier time, such as during product testing or a user training process, a first S-parameter, $Smn_{FS}$=−32 dB, for the pair of antenna arrays 104, 106 for a mutual coupling transmission sent in free space. The device 100 also determines and stores a second S-parameter, $S_{mnObj}$=−42 dB, for the pair of antenna arrays 102,104 for a mutual coupling transmission sent when a nearby lossy object, for instance the user's hand or a portion thereof, causes maximum interference with the mutual coupling transmission and, thereby, causes maximum attenuation of the mutual coupling transmission.

For one implementation scenario, the device 100 is programmed to set a reference coupling value $S_{ref}=S_{mnFS}=-32$ dB; a pre-defined threshold value, $S_{th}=10$ dB, determined by taking the difference between the free space value, $S_{mnFS}$ (−32 dB) and a known blockage value, $S_{mnObj}$ (−42 dB). When the device is in use, a higher difference ($S_{ref}$ measured $S_{mn}$) value triggers a decision at block 306 based on $S_{th}$. During a user training process, the device 100 can further adjust $S_{th}$ to a user-specific threshold value, e.g., of 8 dB, which takes into consideration, for instance, the size and density of the user's hands, etc.

For this implementation scenario, to determine the position of a user's hand relative to the pair of antenna arrays 104, 106 at the time $t_1$, the processor 202 compares the S-parameter at time $t_1$, $S_{t1}$, with the reference coupling value $S_{ref}$. If $S_{t1} < S_{ref}$ by $S_{th}$ (which in this example scenario is 8 dB) or greater, then the processor 202 determines 306 that the object (e.g., the user's hand) is close enough to block or shadow the pair of antenna arrays 104, 106. Otherwise, the processor determines 306 that the pair of antenna arrays 104, 106 is unblocked, un-shadowed, or free. For this particular example, the processor 202 determines 306 that the pair of antenna arrays 104, 106 is un-shadowed because $S_{t1}=S_{ref}$. Accordingly, whether an antenna array or portion thereof is shadowed (blocked) by a nearby lossy object or un-shadowed (unblocked or free) depends on the result of the relevant comparison 304 for a currently measured MCV, which depends at least in part on the threshold value and/or an optimization technique used during the comparison 304.

For another implementation scenario, the device 100 is programmed to set a reference coupling value $S_{ref}=S_2=-42$ dB. The device 100 again sets $S_{th}=8$ dB. For this implementation scenario, if $S_{t1}>S_{ref}$ by $S_{th}$ or greater, then the processor 202 determines 306 that the pair of antenna arrays 104, 106 are un-shadowed. Otherwise, the processor determines 306 that the pair of antenna arrays 104, 106 is shadowed. For this particular example, the processor 202 determines 306 that the pair of antenna arrays 104, 106 is un-shadowed because $S_{t1}$ exceeds $S_{ref}$ by 10 dB, which is more than $S_{th}$.

The above example of implementing blocks 304 and 306 of the method 300 was simplified for understanding the principles with which the device 100 can perform an MCV comparison 304 and resultantly determine 306 object position. As demonstrated, by performing the comparison 304 using a single MCV determined at a given time for a pair of antenna arrays, the device 100 can determine whether the pair of antenna arrays, as a whole, is blocked. In other words, this limited comparison only allows the device 100 to determine that the object is in the vicinity of or somewhere on or in between the pair of antenna arrays 104, 106.

To make a more fine-tuned determination 306 as to which particular antenna array(s) of the pair or which portion of one or both of the antenna arrays of the pair is blocked, the device 100 determines 302 MCVs for multiple different pairs of antenna arrays and can further determine multiple MCVs for the same antenna array pair using different pairs of antenna elements. The device 100 then uses this set of multiple MCVs to perform the comparison 304 to more accurately determine 306 the object position relative to the plurality of antenna arrays 104, 106, 108, 110.

Returning momentarily to our previous example, the device 100 determines 302 at least two other MCVs. Namely, the device 100 determines 302 at the time $t_1$ an S-parameter $S_{t1-a}=-32$ dB from a mutual coupling transmission from a transmitting antenna element in the antenna array 110 to a receiving antenna element in the antenna array 106. The device 100 also determines 302 at the time $t_1$ an S-parameter $S_{t1-b}=-42$ dB from a mutual coupling transmission from a transmitting antenna element in the antenna array 104 to a receiving antenna element in the antenna array 108. Using the same reference coupling value $S_{ref}$ and threshold value $S_{th}$, the device 100 can pinpoint the user's hand position to closer to the antenna array 104 than to the antenna array 106. Additional MCV determinations at 302 can yield even greater accuracy in determining 306 object position.

For another embodiment, the device 100 can determine and store multiple sets of reference coupling values and threshold values, where each set represents a different handgrip profile for a particular handgrip. In turn, each handgrip profile corresponds to and is associated in the device 100 to a certain one or more of the antenna arrays or antenna array portions being shadowed and other of the antenna arrays or antenna array portions being un-shadowed. A handgrip is a particular way in which a user holds or grips a device. For instance, the user can grip the device using his/her right hand (a right-handed grip), his/her left hand (a left-handed grip), or using both hands (in a landscape orientation).

Accordingly, as the user holds the device 100 at a given time, the device 100 determines 302 a set of multiple MCVs and compares 304 the set of MCVs to the plurality of handgrip profiles stored in the device 100. For an embodiment, the device 100 uses a mathematical optimization approach such as a least mean squares algorithm to determine 304 which stored handgrip profile the set of measured MCVs most closely matches. Alternative optimization techniques, such as trapezoidal rule or Simpson's rule approximations, can be used to match the set of measured MCVs to a set of stored reference coupling values, such as for a set of handgrip profiles.

Where a match is found, the device 100 determines 306 the one or more antenna arrays or antenna array portions that are blocked, for instance as corresponds to the handgrip profile. The indication of the blocked antenna array(s) or portions thereof represents the user's hand position relative to the device 100, and more particularly relative to the plurality of antenna arrays of the device 100. Where no match is found, the device 100 determines 306 that no antenna arrays are blocked or that the user is not holding the device 100.

The device 100 can then configure or re-configure (if method 300 is repeated for instance during a call or during operation of a context aware application) 308 the plurality of antenna arrays 104, 106, 108, 110, based on the object, e.g., hand, position. This configuring can involve one or more operations. For one example, the device 100 adjusts a communication transmission from one or more antenna arrays of the plurality of antennas arrays 104, 106, 108, 110 based on the object position. This can include changing a directionality of an antenna beam from an antenna array and/or the transmission power level of the communication transmission. The change can be effected by one or more of: using fewer or different antenna elements of the antenna array to direct the antenna beam from the antenna array; increasing the transmit power while using fewer antenna elements to extend the range of the antenna beam; decreasing transmit power when additional antenna elements of the antenna array are determined to be free because the user moved her hand; stopping the communication transmission from a blocked antenna array or antenna array portion; continuing the communication transmission using an unobstructed antenna array or antenna array portion; etc.

Additionally, configuring 308 the antenna arrays based on the object position can include, but is not limited to one or different combinations of: turning off or deactivating some antenna arrays or antenna array portions (either individual antenna elements or antenna sub-arrays) that are blocked; using some of the blocked antenna elements to send mutual coupling transmissions for the device 100 to repeat the method 300 to track the user's hand movements to, for instance, optimize beamforming and MIMO applications and maximize battery life; or using unblocked antenna arrays or portions thereof for communication transmissions. Deactivating antenna elements can include switching the antenna elements to a receiving mode or switching them off using switches coupled to the antenna elements. Using antenna elements for transmissions can include switching the antenna elements to a transmitting mode using switches coupled to the antenna elements.

Figure 4:
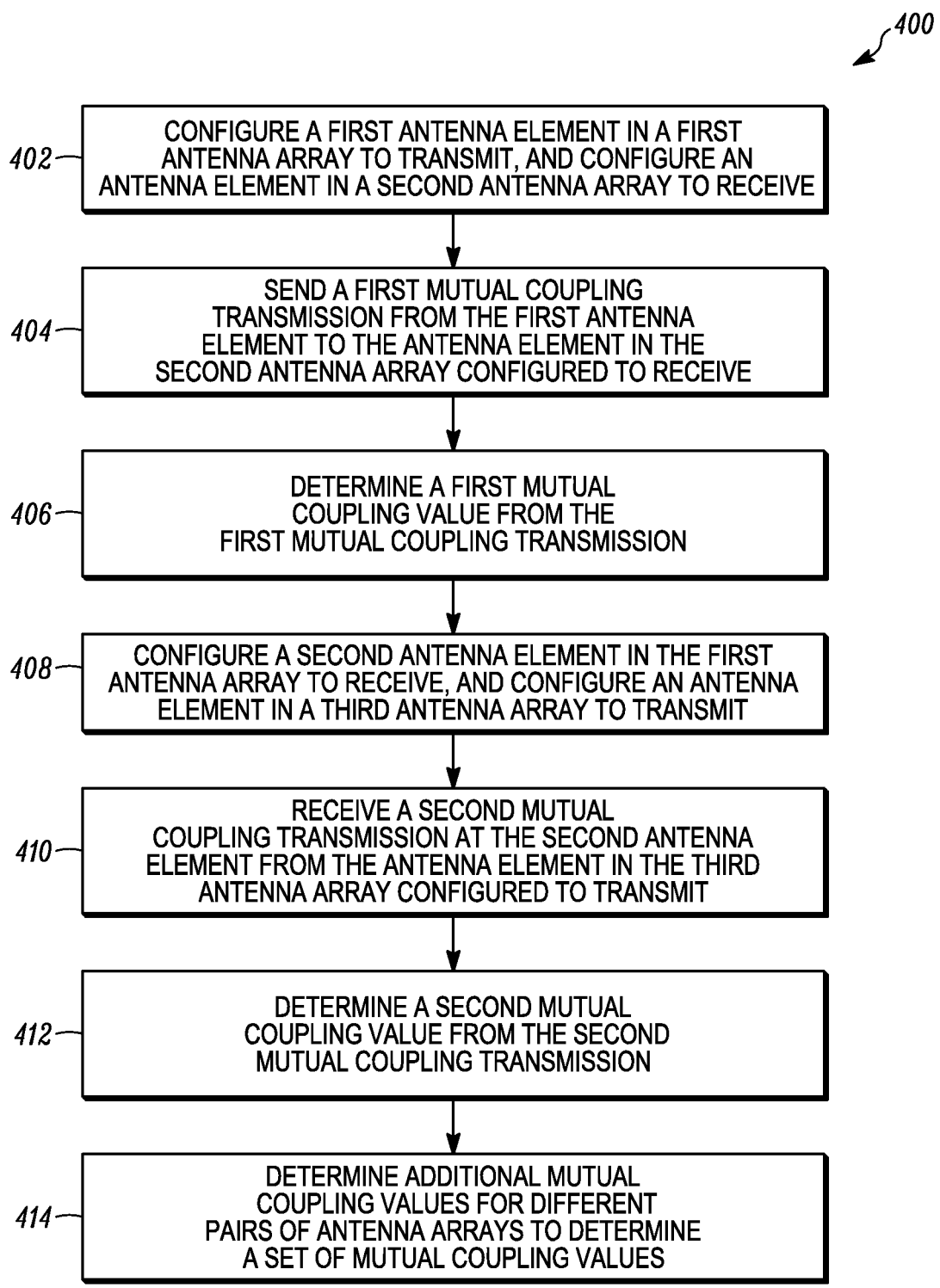
FIG. 4 shows a logical flow diagram illustrating a method for determining mutual coupling values, in accordance with some embodiments.

FIG. 4 shows a logical flow diagram illustrating a method 400 that can be performed by an electronic communication device such as the smartphone 100 for configuring antenna elements to send mutual coupling transmissions for determining MCVs. The method 400 is described with reference to FIGS. 6, 7, 8, and 9, which illustrate the smartphone determining four MCVs $S_{12}$, $S_{34}$, $S_{56}$, and $S_{78}$ from mutual coupling transmissions between antenna elements of four different pairs of the antenna arrays 104, 106, 108, 110. However, the method 400 can be implemented to determine MCVs from mutual coupling transmissions between: antenna elements of additional pairs of the antenna arrays 104, 106, 108, 110; different antenna elements of the same pairs of antenna arrays; different transmission directions between the same antenna elements or different antenna elements; etc.

Moreover, for one embodiment, multiple MCVs (such as the four MCVs illustrated in FIGS. 6, 7, 8, and 9) can be determined based on sequential mutual coupling transmissions, occurring at different times, between the different pairs of antenna elements. For example, the transmitting antenna element of a first pair of antenna elements sends a mutual coupling transmission for one millisecond. Thereafter, the transmitting antenna element for a second pair of antenna elements sends a mutual coupling transmission for one millisecond. The sequential mutual coupling transmissions occur until all of the MCVs for the set are determined. For another embodiment, the multiple MCVs can be determined based on contemporaneous mutual coupling transmissions, occurring at the same or substantially the same time, between the different pairs of antenna elements. For this embodiment, each contemporaneous mutual coupling transmission can be sent at a different transmission frequency to minimize cross-talk, which could skew the MCV determinations and the resulting determination of object position.

In accordance with the method 400, the smartphone 100 configures 402 an antenna element in a first antenna array to transmit and configures 402 an antenna element in a second antenna array to receive. The smartphone sends 404 a first mutual coupling transmission between the antenna elements of the first and second antenna arrays, and determines 406 a first mutual coupling value from the first mutual coupling transmission. The smartphone 100 also configures 408 an antenna element in the first antenna array to receive and configures 408 an antenna element in a third antenna array to transmit. The smartphone sends 410 a second mutual coupling transmission between the antenna elements of the first and third antenna arrays, and determines 412 a second mutual coupling value from the second mutual coupling transmission. Similarly, the smartphone 100 determines 414 additional mutual coupling values for different pairs of antenna arrays to determine a full set of mutual coupling values.

Figure 6:
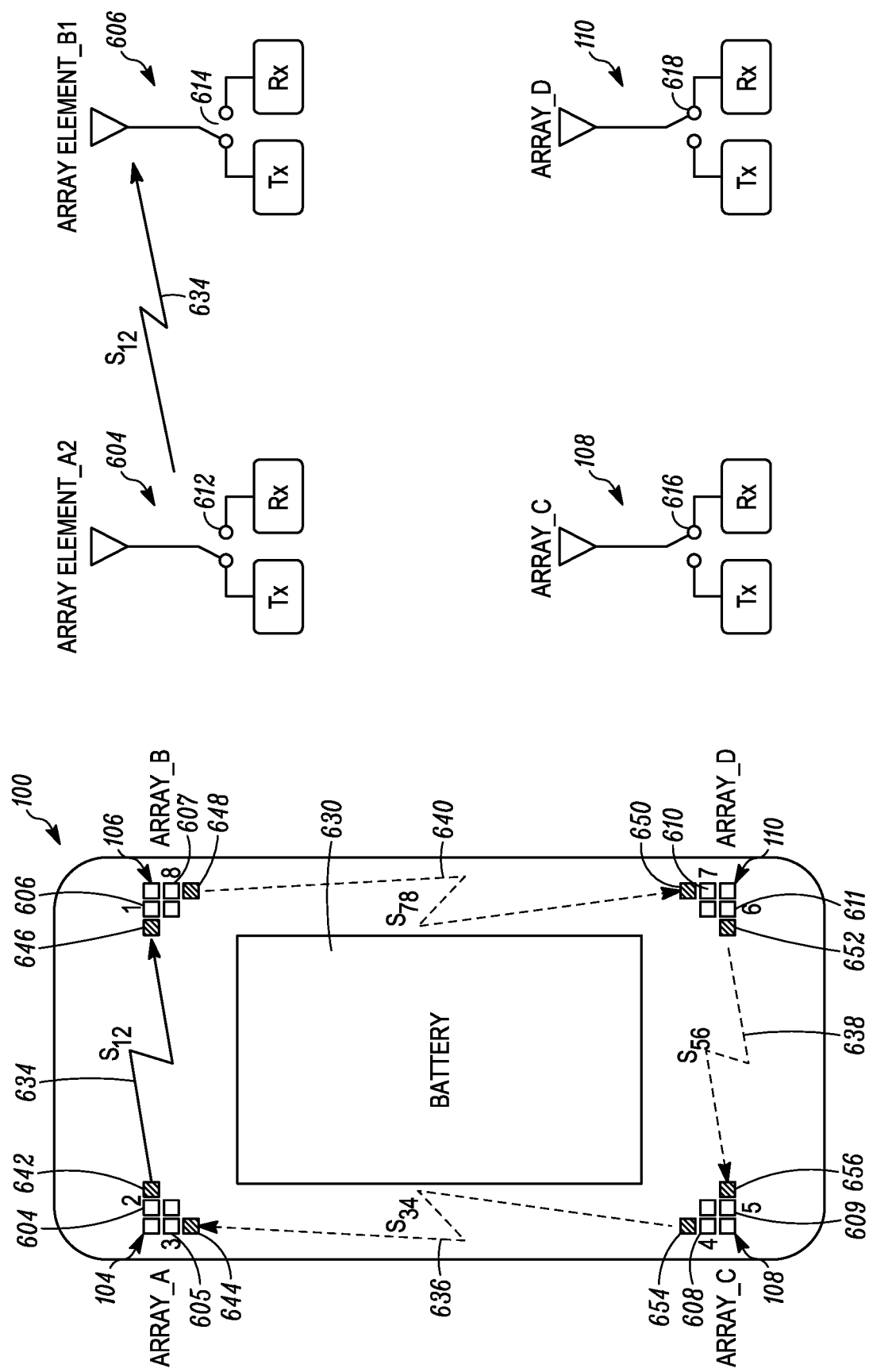
FIG. 6 shows an electronic communication device having antenna arrays which include antenna elements used in determining mutual coupling values, in accordance with some embodiments.
Figure 7:
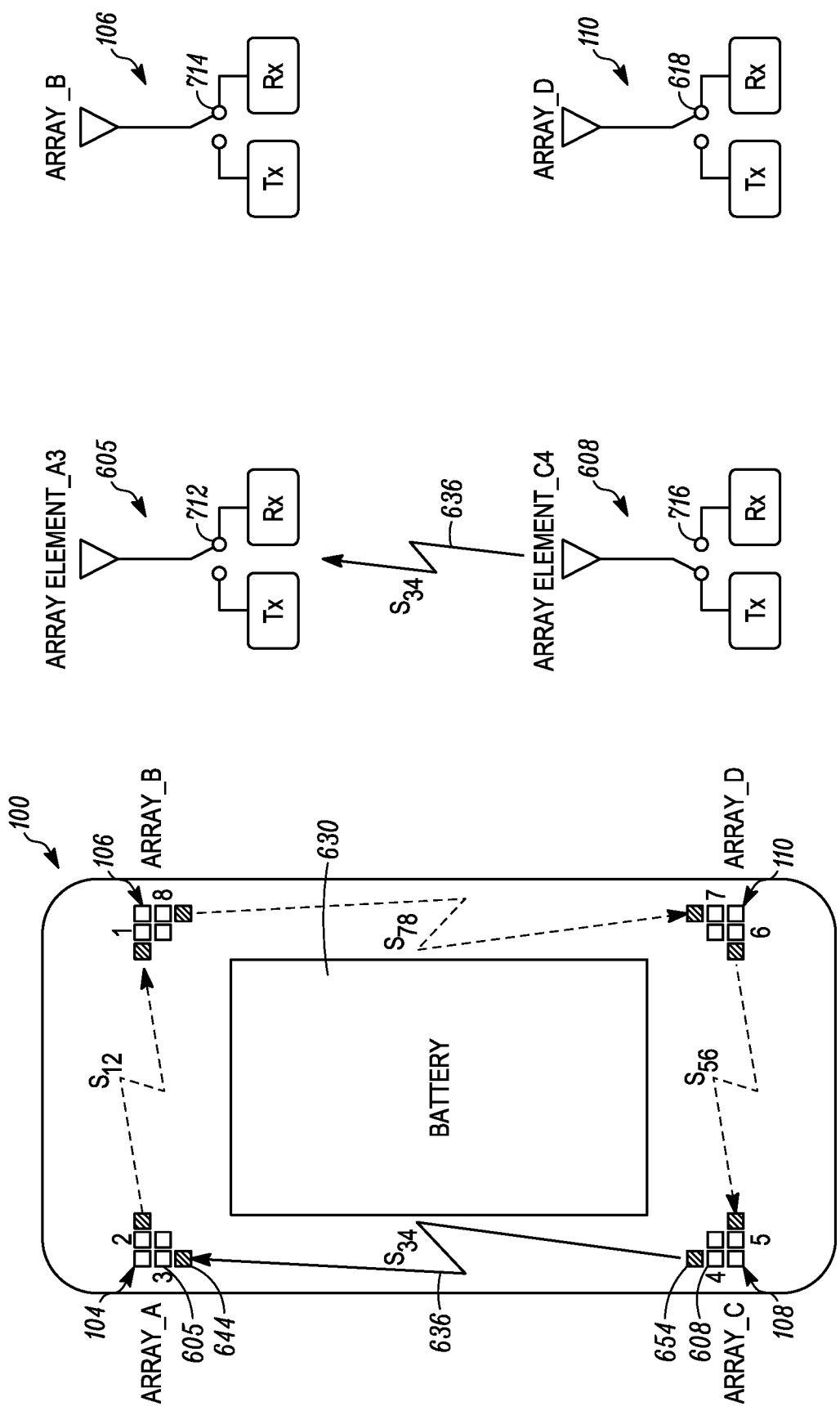
FIG. 7 shows an electronic communication device having antenna arrays which include antenna elements used in determining mutual coupling values, in accordance with some embodiments.
Figure 8:
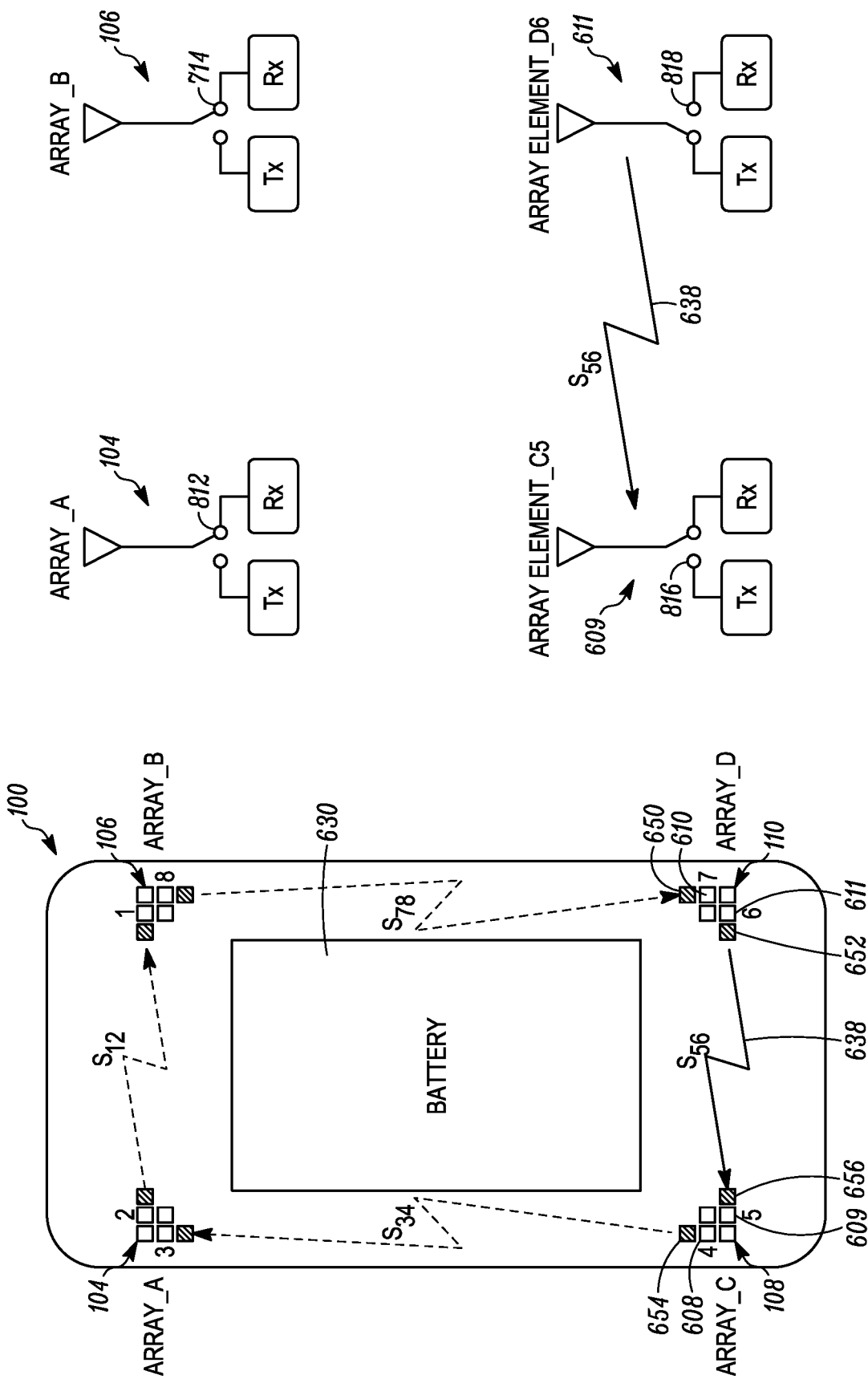
FIG. 8 shows an electronic communication device having antenna arrays which include antenna elements used in determining mutual coupling values, in accordance with some embodiments.
Figure 9:
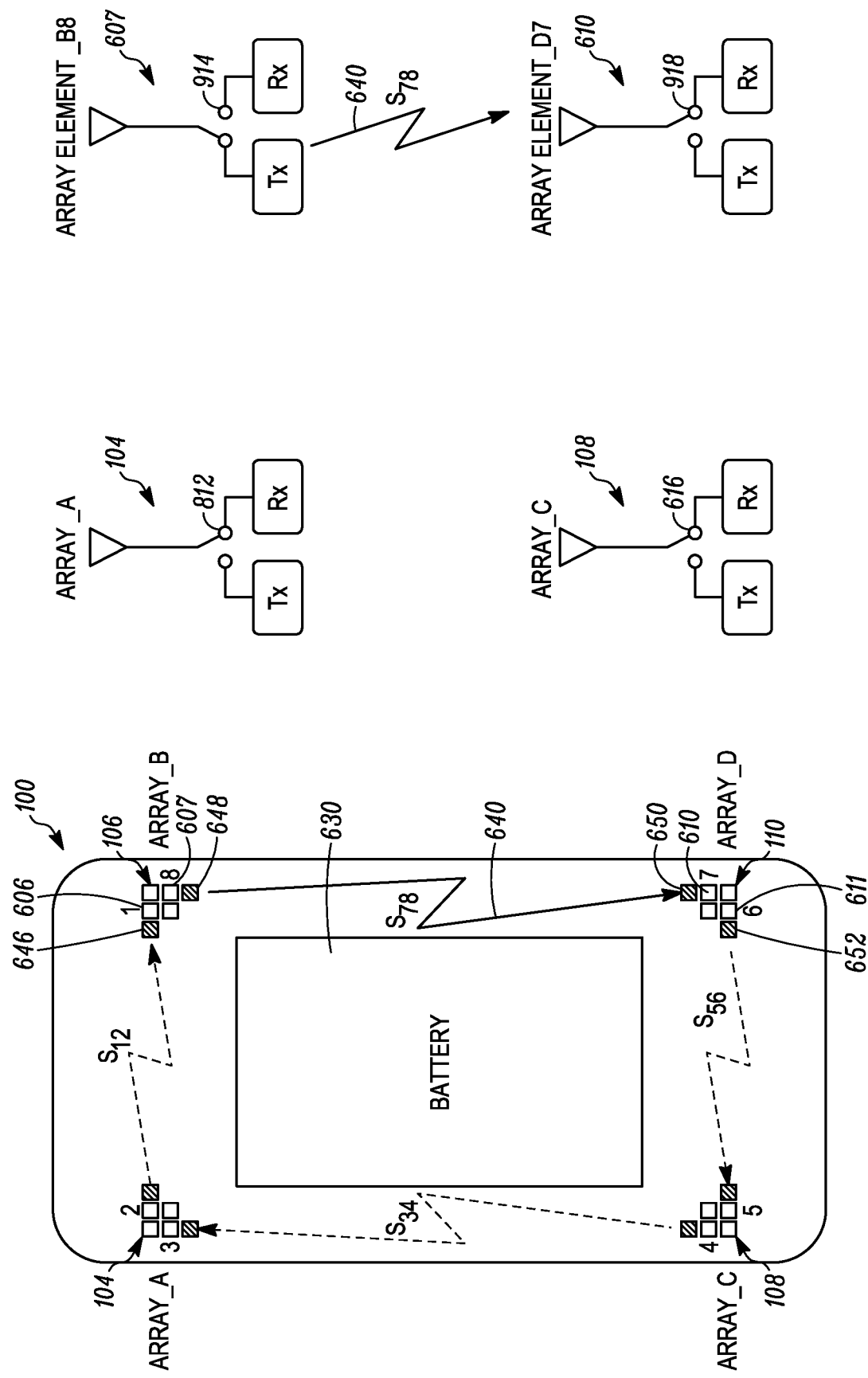
FIG. 9 shows an electronic communication device having antenna arrays which include antenna elements used in determining mutual coupling values, in accordance with some embodiments.

As illustrated in FIG. 6, shown as part of the smartphone 100 is a battery 630, which serves as the power supply 230, and the four antenna arrays 104, 106, 108, 110, which are also labeled, respectively, as ARRAY_A, ARRAY_B, ARRAY_C, and ARRAY_D. Each antenna array comprises four active antenna elements and two parasitic antenna elements. For example, the antenna array 104 includes active antenna elements A2 (604) and A3 (605) and parasitic antenna elements 642 and 644. The antenna array 106 includes active antenna elements B1 (606) and B8 (607) and parasitic antenna elements 646 and 648. The antenna array 108 includes active antenna elements C4 (608) and C5 (609) and parasitic antenna elements 654 and 656. The antenna array 110 includes active antenna elements D6 (611) and D7 (610) and parasitic antenna elements 650 and 652.

In the illustrated embodiment, each active antenna element is coupled to a separate transceiver, having transmitter and receiver hardware, using a separate SPDT switch. For example, antenna element A2 (604) is coupled to a transceiver using a switch 612. Antenna element B1 (606) is coupled to a transceiver using a switch 614. Antenna element A3 (605) is coupled to a transceiver using a switch 712. Antenna element C4 (608) is coupled to a transceiver using a switch 716. Antenna element C5 (609) is coupled to a transceiver using a switch 816. Antenna element D6 (611) is coupled to a transceiver using a switch 818. Antenna element B8 (607) is coupled to a transceiver using a switch 914. Antenna element D7 (610) is coupled to a transceiver using a switch 918.

To determine the first MCV using the method 400, the smartphone 100 configures 402 the antenna element 604 of a first antenna array 104 to transmit by connecting the antenna element 604 to the transmitter hardware using the switch 612 and configures 402 the antenna element 606 of a second antenna array 106 to receive by connecting the antenna element 606 to the receiver hardware using the switch 614. For a particular embodiment when determining the MCVs, all the antenna elements not being used to transmit are coupled to respective receiver hardware. Illustratively, all the antenna elements of the antenna array 108 are coupled to receiver hardware by respective switches (shown collectively as a switch 616). Additionally, all the antenna elements of the antenna array 110 are coupled to receiver hardware by respective switches (shown collectively as a switch 618). Although not shown, the antenna elements of antenna arrays 104 and 106 not used for mutual coupling transmissions can also be coupled to respective receiver hardware.

The antenna element 604 sends 404 a first mutual coupling transmission 634 to the antenna element 606 from which the S-parameter $S_{12}$ is determined 406 as the first MCV. The parasitic antenna element 642 adjacent to the transmitting antenna element 604 and the parasitic antenna element 646 adjacent to the receiving antenna element 606 enables the mutual coupling transmission 634 to be sent using a lower transmit power than is used for communication transmissions.

To determine the second MCV using the method 400, the smartphone 100 configures 408 the antenna element 605 of the first antenna array 104 to receive by connecting the antenna element 605 to the receiver hardware using the switch 712 and configures 408 the antenna element 608 of a third antenna array 108 to transmit by connecting the antenna element 608 to the transmitter hardware using the switch 716. All the antenna elements of the antenna array 106 are coupled to receiver hardware by respective switches (shown collectively as a switch 714). Additionally, all the antenna elements of the antenna array 110 are coupled to receiver hardware by respective switches (shown collectively as the switch 618). Although not shown, the antenna elements of antenna arrays 104 and 106 not used for mutual coupling transmissions can also be coupled to respective receiver hardware.

The antenna element 608 sends 410 a second mutual coupling transmission 636 to the antenna element 605 from which the S-parameter $S_{34}$ is determined 412 as the second MCV. The parasitic antenna element 654 adjacent to the transmitting antenna element 608 and the parasitic antenna element 644 adjacent to the receiving antenna element 605 enables the mutual coupling transmission 636 to be sent using a lower transmit power than is used for communication transmissions.

To determine 414 a third MCV using the method 400, the smartphone 100 configures the antenna element 611 of a fourth antenna array 110 to transmit by connecting the antenna element 611 to the transmitter hardware using the switch 818 and configures the antenna element 609 of the third antenna array 108 to receive by connecting the antenna element 609 to the receiver hardware using the switch 816. All the antenna elements of the antenna array 104 are coupled to receiver hardware by respective switches (shown collectively as a switch 812). Additionally, all the antenna elements of the antenna array 106 are coupled to receiver hardware by respective switches (shown collectively as the switch 714). Although not shown, the antenna elements of antenna arrays 108 and 110 not used for mutual coupling transmissions can also be coupled to respective receiver hardware.

The antenna element 611 sends a third mutual coupling transmission 638 to the antenna element 609 from which the S-parameter $S_{56}$ is determined as the third MCV. The parasitic antenna element 652 adjacent to the transmitting antenna element 611 and the parasitic antenna element 656 adjacent to the receiving antenna element 609 enables the mutual coupling transmission 638 to be sent using a lower transmit power than is used for communication transmissions.

To determine 414 a fourth MCV using the method 400, the smartphone 100 configures the antenna element 607 of the second antenna array 106 to transmit by connecting the antenna element 607 to the transmitter hardware using the switch 914 and configures the antenna element 610 of the fourth antenna array 110 to receive by connecting the antenna element 610 to the receiver hardware using the switch 918. All the antenna elements of the antenna array 108 are coupled to receiver hardware by respective switches (shown collectively as the switch 616). Additionally, all the antenna elements of the antenna array 104 are coupled to receiver hardware by respective switches (shown collectively as the switch 812). Although not shown, the antenna elements of antenna arrays 106 and 110 not used for mutual coupling transmissions can also be coupled to respective receiver hardware.

The antenna element 607 sends a fourth mutual coupling transmission 640 to the antenna element 610 from which the S-parameter $S_{78}$ is determined as the fourth MCV. The parasitic antenna element 648 adjacent to the transmitting antenna element 607 and the parasitic antenna element 650 adjacent to the receiving antenna element 610 enables the mutual coupling transmission 640 to be sent using a lower transmit power than is used for communication transmissions.

FIG. 5 shows a logical flow diagram illustrating an embodiment of a method 500 that can be performed by the smartphone 100 for determining object position based on measured MCVs. The method 500 is also described with reference to FIGS. 6, 7, 8, and 9. Using the method 400, for instance, the smartphone 100 sequentially sends 502 mutual coupling transmissions 634, 636, 638, 640 from antenna elements 2, 4, 6, and 8, respectively. The smartphone 100 measures 504 the power level of the mutual coupling transmissions 634, 636, 638, and 640 received, respectively, at the antenna elements 1, 3, 5, and 7 from which the smartphone 100 determines and stores 506 the mutual coupling values $S_{12}$, $S_{34}$, $S_{56}$, and $S_{78}$.

The smartphone 100 compares 508 $S_{12}$, $S_{34}$, $S_{56}$, and $S_{78}$ to stored sets of reference values and corresponding threshold values, with each set representing a different handgrip profile. When the smartphone 100 fails at 510 to match the measured S-parameters $S_{12}$, $S_{34}$, $S_{56}$, and $S_{78}$ to a handgrip profile, the smartphone 100 can determine another set of S-parameters as illustrated by the method 500 returning to block 502. Alternatively, the smartphone 100 ends the method 500. However, when the smartphone 100 determines 510 that the measured S-parameters $S_{12}$, $S_{34}$, $S_{56}$, and $S_{78}$ match a particular handgrip profile, the smartphone 100 identifies 512 the antenna elements shadowed by the hand position that correlates with the matched handgrip profile.

For example, the S-parameters $S_{34}$, $S_{56}$, and $S_{78}$ determined at 506 indicate attenuated mutual coupling transmissions 636, 638, and 640 respectively received at antenna elements 3, 5, and 7. The smartphone 100 determines 510 that the measured set of S-parameters matches a handgrip profile representing the user holding the device 100 in one hand and operating the device with the user's thumb. This handgrip profile corresponds to the antenna arrays 108 and 110 being shadowed, for instance by the user's palm. The smartphone 100 configures the antenna elements of its antenna arrays based on this hand position.

For the embodiment of the smartphone 100 having millimeter-wave antenna arrays, the smartphone 100 can perform one or a combination of the following operations based on the hand position: operating 514 a shadowed antenna element of a first millimeter-wave antenna array and a shadowed antenna element of a second millimeter-wave antenna array for a mutual coupling transmission; operating 514 an un-shadowed first sub-array of the first millimeter-wave antenna array for communication transmissions; deactivating 514 a shadowed second sub-array of the second millimeter-wave antenna array. The smartphone 100 can further deactivate 516 one or more shadowed sub-6 GHz antenna elements based on the hand position.

For example, if the smartphone 100 is in a call with another device, the smartphone 100 operates 514 antenna elements of one or both of the un-shadowed antenna arrays 104 and 106 for communication transmissions to the other device (e.g. base station). Which of the antenna arrays 104 and/or 106 and which of the constituent antenna elements of these arrays are used for beamforming, for instance, can depend on the other device's location and distance relative to the smartphone 100. The smartphone 100 can also continue to use the antenna elements 2 and 3 of the antenna array 104 and the antenna elements 1 and 8 of the antenna array 106 for mutual coupling transmissions to periodically determine MCVs during the call, when these antenna elements aren't being used for communication transmissions.

Alternatively, the smartphone 100 uses the antenna elements 1, 2, 3, and 8 for the mutual coupling transmissions and uses sub-arrays of the remaining antenna elements of the antenna arrays 104 and 106 for the communication transmissions.

The smartphone 100 deactivates 514 antenna elements of the shadowed antenna arrays 108 and 110 or operates 514 the antenna elements of the shadowed antenna arrays for mutual coupling transmissions, to continue to monitor MCVs and, thereby, the hand position during the call. For instance, the smartphone 100 operates the antenna elements 4 and 5 of the antenna array 108 and the antenna elements 6 and 7 of the antenna array 110 for mutual coupling transmissions. The smartphone 100 deactivates the other two active antenna elements of each of the antenna arrays 108 and 110, for instance by switching the SPDT switch for these antenna elements to connect to the receiver hardware and by stopping DC power to the switches.

Additionally, the smartphone 100 can be configured or programmed to know the physical locations of all the antenna arrays within the smartphone 100. Accordingly, the smartphone 100 can deactivate 516, as shadowed, those sub-6 GHz antenna elements that are proximate to the shadowed antenna arrays 108 and 110. For another embodiment, the smartphone 100, e.g., via the processor 202 that determined the hand position, makes an application processor aware 518 of the hand position to open, close, and/or operate one or more context aware applications. A "context-aware" application, also referred to herein as a "context-dependent" application is an application that responds based on the way a user interacts with a device, such as holding, touching, and/or gesturing over the device. Examples include, but are not limited to, gesture detection, volume control, operating or focusing a camera, orienting the screen, etc.

For instance, where the smartphone 100 determines that the user is holding the smartphone 100 using the one-handed handgrip, the smartphone 100 notifies 518 an application processor in the smartphone 100, which activates a camera in anticipation of the user taking a selfie. If the smartphone 100 determines, for instance, that the user is holding the smartphone with both hands, the smartphone 100 can notify the application processor, which can change a screen mode from portrait to landscape in anticipation of the user playing a video. Additionally, where the smartphone 100 determines that the user has picked up the phone, based on a determination 512 that one or more antenna arrays are blocked, the smartphone 100 can notify the application processor, which can light up the screen and provide notifications of text messages, emails, the time, the weather, etc.

FIGS. 10, 11, 12, 13, 14, and 15 show different embodiments for arranging antenna elements within the antenna arrays of an electronic communication device, such as the smartphone 100. FIG. 10, for example, shows the smartphone 100 as including an antenna array 1006 having two parasitic elements 1046 and 1048 and eight active antenna elements. The smartphone 100 includes three additional antenna arrays having a similar physical arrangement as antenna array 1006, such that a similarly-arranged antenna array is positioned at each of the four corners of the smartphone 100.

FIG. 11 shows the smartphone 100 as including an antenna array 1106 having two parasitic elements 1146 and 1148 and sixteen active antenna elements. The smartphone 100 includes three additional antenna arrays having a similar physical arrangement as antenna array 1106, such that a similarly-arranged antenna array is positioned at each of the four corners of the smartphone 100.

FIG. 12 shows the smartphone 100 as including an antenna array 1206 having two parasitic elements 1246 and 1248 and sixteen active antenna elements. The smartphone 100 includes three additional antenna arrays having a similar physical arrangement as antenna array 1206, such that a similarly-arranged antenna array is positioned at each of the four corners of the smartphone 100. However, in FIG. 12, the antenna elements are rotated 45 degrees from the antenna elements shown in FIG. 11. Rotating the antenna elements 45 degrees creates additional space between antenna elements, which increases the physical area occupied by the antenna arrays on the device 100. The increased area occupied by the antenna arrays decreases the likelihood that all of the antenna elements of a particular array will be blocked by a user's hand in the vicinity of the antenna array.

FIG. 13 shows the smartphone 100 as including an antenna array 1306 having three parasitic elements 1346, 1348, and 1358 and eight active antenna elements. The smartphone 100 includes three additional antenna arrays having a similar physical arrangement as antenna array 1306, such that a similarly-arranged antenna array is positioned at each of the four corners of the smartphone 100.

FIG. 14 shows the smartphone 100 as including an antenna array 1406 having three parasitic elements 1446, 1448, and 1458 and sixteen active antenna elements. The smartphone 100 includes three additional antenna arrays having a similar physical arrangement as antenna array 1406, such that a similarly-arranged antenna array is positioned at each of the four corners of the smartphone 100.

FIG. 15 shows the smartphone 100 as including an antenna array 1506 having three parasitic elements 1546, 1548, and 1558 and sixteen active antenna elements. The smartphone 100 includes three additional antenna arrays having a similar physical arrangement as antenna array 1506, such that a similarly-arranged antenna array is positioned at each of the four corners of the smartphone 100. However, in FIG. 15, the antenna elements are rotated 45 degrees from the antenna elements shown in FIG. 14.

Having the additional active and parasitic antenna elements in the antenna array configurations shown in FIGS. 10 through 15 enables additional flexibility in: determining MCVs; determining from the MCVs object position and which antenna elements are shadowed and which are un-shadowed by the object position; and determining how to configure the antenna elements of the multiple antenna arrays in view of the object position. For example, the antenna array configuration shown in FIGS. 6 through 9 enabled only four MCVs to be determined using low-power transmissions based on the placement of the parasitic antenna elements. Accordingly, the accuracy with which object position could be determined was relative to the level of an antenna array as a whole. However, the additional active and parasitic antenna elements in the antenna array configurations shown in FIGS. 10 through 15 enables at least six MCVs to be determined between antenna elements of six different pairs on antenna arrays. This in turn enables the smartphone 100 to determine object position with accuracy relative to sub-arrays of a minimum of four antenna elements.

For instance, with respect to the antenna array configurations shown in FIGS. 10 through 12, from 6 MCV calculations from low-power mutual coupling transmissions, the smartphone 100 can determine whether the upper four or the lower four groups of antenna elements of each of the four antenna arrays is blocked or unblocked. With respect to the antenna array configurations shown in FIGS. 13 through 15, from 8 MCV calculations from low-power mutual coupling transmissions, the smartphone 100 can determine whether the upper left four, the upper right four, the lower left four, or the lower right four groups of antenna elements of each of the four antenna arrays is blocked or unblocked. Different antenna array configurations with different numbers of active and parasitic antenna elements can enable more or less fine-tuned determinations of object position relative to individual antenna elements or antenna sub-arrays.

FIG. 16 shows a logical flow diagram illustrating an embodiment of a method 1600 for determining object position based on measured or calculated MCVs. An electronic communication device, such as the smartphone 100, determines 1602 a set of MCVs, e.g., an S-matrix, for at least one pair of a plurality of antenna arrays of the smartphone 100.

For this embodiment, the smartphone 100 determines 1604 a set of difference values between pairs of MCVs within the same set of MCVs to determine object position, and the smartphone 100 compares 1606 each difference value to a threshold value, $MCV_{th}$. If the smartphone 100 determines 1606 that none of the difference values exceeds $MCV_{th}$, the smartphone 100 determines that none of the antenna arrays are blocked or that a user is not holding the smartphone 100. The smartphone 100 then waits 1608 for a programmed time interval and determines 1602 another set of MCVs from which to detect object position.

However, if the smartphone 100 determines 1606 that at least some of the difference values exceed $MCV_{th}$, the smartphone 100 can determine 1610 which antenna arrays are blocked based on which particular MCVs exceed $MCV_{th}$. The blocked antenna arrays correlate to object position relative to the plurality of antenna arrays of the smartphone 100. The smartphone can then configure 1612 its antenna arrays based on the object position, for instance as described in general by reference to block 308 of the method 300 illustrated in FIG. 3.

FIG. 17 illustrates an example of how an electronic communication device can implement the method 1600. Namely, FIG. 17 shows a logical flow diagram illustrating an embodiment of a method 1700 for determining object position based on multiple difference values calculated for MCVs within the same set of MCVs. For a particular embodiment, the method 1700 is described as performed by a smartphone 100 having an antenna array configuration as illustrated in FIG. 18 or FIG. 19.

Figure 18:
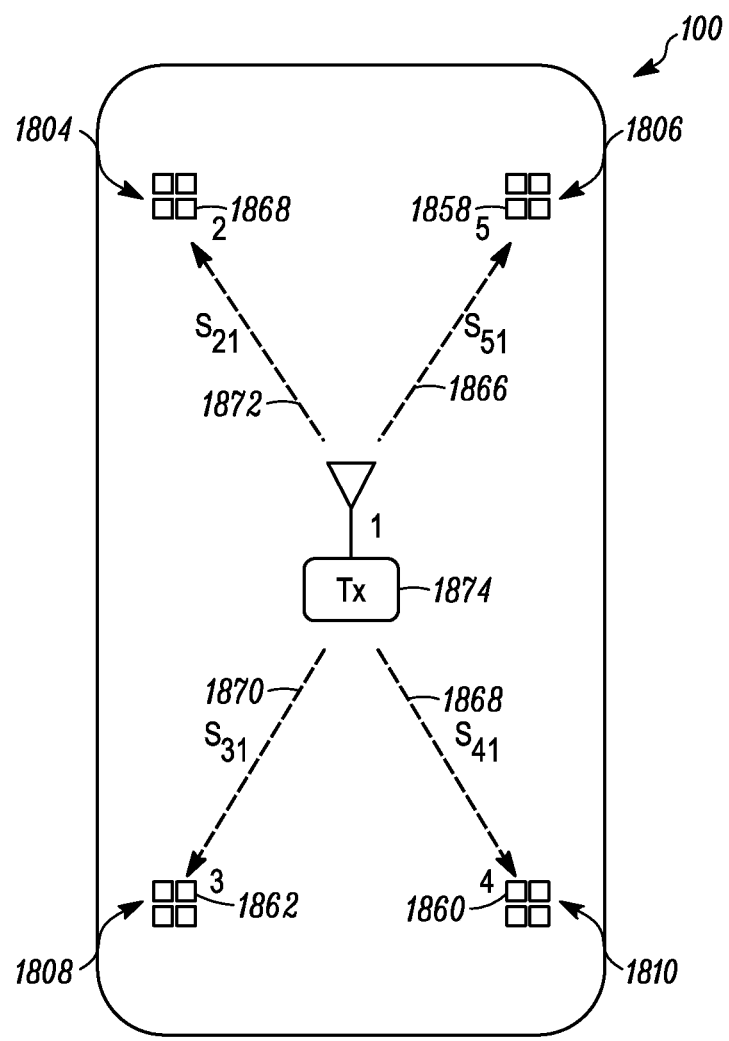
FIG. 18 shows a configuration of antenna arrays for an electronic communication device, in accordance with some embodiments.
Figure 19:
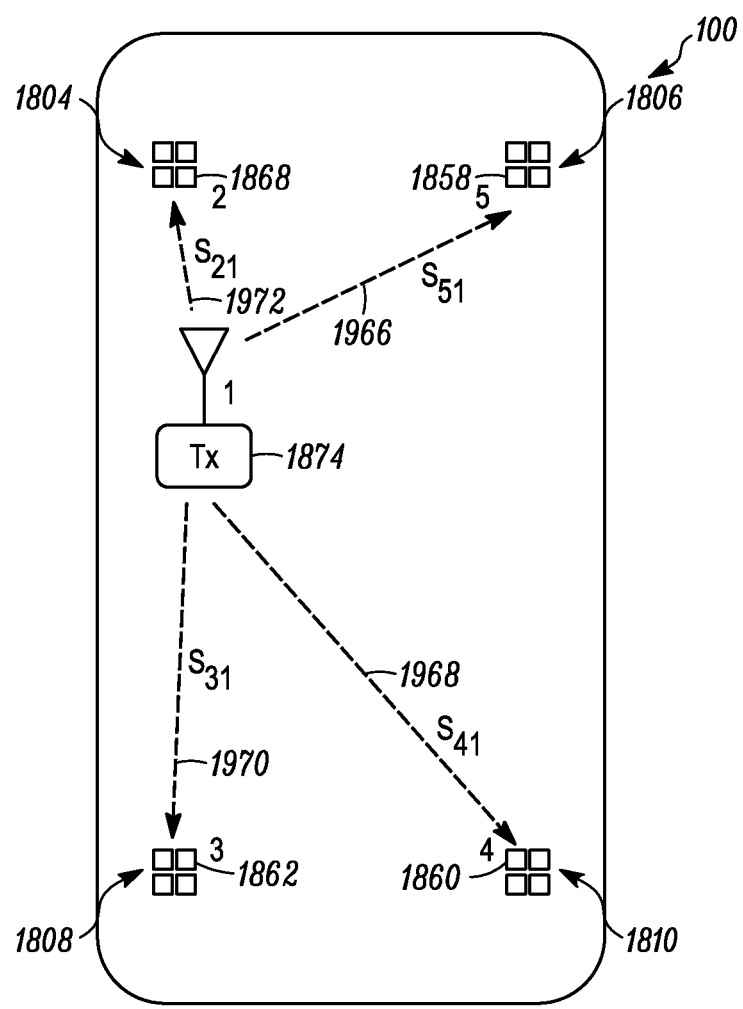
FIG. 19 shows a configuration of antenna arrays for an electronic communication device, in accordance with some embodiments.

In FIGS. 18 and 19, the smartphone 100 is shown with five antenna arrays 1804, 1806, 1808, 1810, and 1874. Four of the antenna arrays, e.g., 1804, 1806, 1808, and 1810, are symmetrically located near the four corners of the smartphone 100. In an embodiment, the antenna arrays 1804, 1806, 1808, and 1810 each include four active antenna elements and are each used for both communication transmissions and for mutual coupling transmissions. Although not shown, the antenna arrays 1804, 1806, 1808, 1810 can also include one or more parasitic antenna elements to enable low-power mutual coupling transmissions as earlier described.

However, the antenna array 1874 is a "hub" antenna array that is dedicated for exchanging, e.g., sending or receiving, mutual coupling transmissions with the other antenna arrays 1804, 1806, 1808, and 1810, from which the smartphone 100 determines MCVs. The antenna array 1874 is symmetrically positioned relative to the antenna arrays 1804, 1806, 1808, 1810 of the smartphone 100 embodiment shown in FIG. 18 and asymmetrically positioned relative to the antenna arrays 1804, 1806, 1808, 1810 of the smartphone 100 embodiment shown in FIG. 19.

For an embodiment, the antenna array 1874 has a single antenna element 1 that is coupled to a transmitter, e.g., via a SPDT switch (not shown). The antenna array 1874 is, thereby, configured to send mutual coupling transmissions from the transmitting antenna element 1 to receiving antenna elements, e.g., 1868 (2), 1862 (3), 1860 (4), and 1858 (5) of antenna arrays 1804, 1808, 1810, 1806, respectively. For an alternative embodiment, the antenna element is coupled to a receiver and is, thereby, configured to receive mutual coupling transmissions from the antenna elements 2, 3, 4, and 5.

Returning to the method 1700, the smartphone 100 sends 1702 a mutual coupling transmission from the hub antenna element 1, which is received at the antenna elements 2, 3, 4, and 5. The mutual coupling transmission can be a single transmission sent during a given time interval at a suitable power level. However, for purposes of clarity, in FIG. 18, the mutual coupling transmission between antenna elements 1 and 2 is labeled as 1872, between elements 1 and 3 is labeled as 1870, between elements 1 and 4 is labeled as 1868, and between elements 1 and 5 is labeled as 1866. In FIG. 19, the mutual coupling transmission between antenna elements 1 and 2 is labeled as 1972, between elements 1 and 3 is labeled as 1970, between elements 1 and 4 is labeled as 1968, and between elements 1 and 5 is labeled as 1966.

The smartphone 100 measures 1704 the power level of the mutual coupling transmissions received at the antenna elements 2, 3, 4, and 5, from which it determines 1706 and stores S-parameters $S_{21}$, $S_{31}$, $S_{41}$, and $S_{51}$. Particularly, the smartphone 100 determines: $S_{21}$ from the power level measurement of the mutual coupling transmission 1872 or 1972; $S_{31}$ from the power level measurement of the mutual coupling transmission 1870 or 1970; $S_{41}$ from the power level measurement of the mutual coupling transmission 1868 or 1968; and $S_{51}$ from the power level measurement of the mutual coupling transmission 1866 or 1966.

The smartphone 100 determines 1708 difference values between multiple pairs of the S-parameters. Table 1 below includes multiple difference value calculations, wherein each difference value is illustrated as a $\Delta$. For this embodiment, three difference values are calculated 1708 for each of the four corner antenna arrays 1804, 1808, 1810, 1806, which has an antenna element, respectively 2, 3, 4, and 5, that receives the mutual coupling transmission from the hub antenna element 1. By analyzing 1710 the three difference values for a particular corner antenna array, the smartphone 100 can determine 1714 the position of an object, such as a user's hand, relative to that corner antenna array and the hub antenna array 1874. For example, by analyzing 1710 the difference values $\Delta_{23}$, $\Delta_{24}$, and $\Delta_{25}$, the smartphone 100 can identify 1714 whether antenna element 1804 is shadowed or un-shadowed.

TABLE 1

| | | | |
|---|---|---|---|
| ARRAY 1804 | $\Delta_{23} = \|S_{21}\| - \|S_{31}\|$ | $\Delta_{24} = \|S_{21}\| - \|S_{41}\|$ | $\Delta_{25} = \|S_{21}\| - \|S_{51}\|$ |
| ARRAY 1808 | $\Delta_{34} = \|S_{31}\| - \|S_{41}\|$ | $\Delta_{35} = \|S_{31}\| - \|S_{51}\|$ | $\Delta_{32} = \|S_{31}\| - \|S_{21}\|$ |
| ARRAY 1810 | $\Delta_{45} = \|S_{41}\| - \|S_{51}\|$ | $\Delta_{42} = \|S_{41}\| - \|S_{21}\|$ | $\Delta_{43} = \|S_{41}\| - \|S_{31}\|$ |
| ARRAY 1806 | $\Delta_{52} = \|S_{51}\| - \|S_{21}\|$ | $\Delta_{53} = \|S_{51}\| - \|S_{31}\|$ | $\Delta_{54} = \|S_{51}\| - \|S_{41}\|$ |

Namely, the smartphone 100 compares 1710 the difference values to one or more threshold values to identify 1714 antenna elements that are shadowed by the hand position. For the simplest case, applicable to the antenna array configuration illustrated in FIG. 18, the threshold value is the same for all comparisons. More particularly, because the corner antenna arrays 1804, 1806, 1808, 1810 are equidistant or substantially equidistant from the hub antenna array 1874, the S-parameters are the same or substantially the same when the smartphone 100 is in free space. Therefore, the difference between all pairs of the S-parameters is zero or substantially zero when the smartphone 100 is in free space. Accordingly, the smartphone 100 determines that no antenna arrays are blocked upon determining 1710 that none of the difference values exceeds the threshold value, whereupon the smartphone 100 waits 1712 a time interval t and restarts the method at block 1702.

For the case applicable to the antenna array configuration illustrated in FIG. 19, the threshold value used for a given corner antenna array depends on the distance of that antenna array from the hub antenna array 1874. These different threshold values are used in the comparisons performed at 1710, which involve more complicated calculations than the simplest case where the corner antenna arrays are equidistant from the hub antenna array.

Returning to the simplest case scenario, when the smartphone 100 determines 1710 that all three difference values (magnitudes) for a particular corner antenna array exceed the threshold value, the smartphone identifies 1714 that the hand is positioned somewhere between that corner antenna array and the hub antenna array, thereby shadowing that corner antenna array. For an embodiment, the analysis that the smartphone 100 performs in blocks 1710 and 1714 can be done using comparisons and threshold values illustrated in Table 2 below for the antenna arrays 1804, 1806, 1808, and 1810. For example, as shown in Table 2, the smartphone 100 determines that antenna array 1804 is shadowed when the magnitudes of the difference values $\Delta_{23}$, $\Delta_{24}$, and $\Delta_{25}$ all exceed the threshold value $S_{th}$. Similar comparisons 1710 are performed for the remaining corner antenna arrays 1806, 1808, and 1810 to identify 1714 whether a user's hand shadows any of these antenna arrays.

TABLE 2

| ARRAY 1804 | If all $\{\Delta_{23}, \Delta_{24}, \Delta_{25}\} \geq S_{th}$ |
| --- | --- |
| ARRAY 1806 | If all $\{\Delta_{52}, \Delta_{53}, \Delta_{54}\} \geq S_{th}$ |
| ARRAY 1808 | If all $\{\Delta_{34}, \Delta_{35}, \Delta_{32}\} \geq S_{th}$ |
| ARRAY 1810 | If all $\{\Delta_{45}, \Delta_{42}, \Delta_{43}\} \geq S_{th}$ |

Once the smartphone 100 determines 1714 the hand position relative to the antenna arrays 1804, 1806, 1808, 1810, the smartphone 100 configures the antenna arrays based on the hand position. For an embodiment, the smartphone 100 can perform one or a combination of the following operations based on the hand position: operating 1716 a shadowed antenna element of a first millimeter-wave antenna array and a shadowed antenna element of a second millimeter-wave antenna array for a mutual coupling transmission; operating 1716 an un-shadowed first sub-array of the first millimeter-wave antenna array for communication transmissions; deactivating 1716 a shadowed second sub-array of the second millimeter-wave antenna array. The smartphone 100 can further deactivate 1718 one or more shadowed sub-6 GHz antenna elements based on the hand position or inform 1720 an application processor about the hand position to open, close, or operate one or more context aware applications. For one example implementation, the smartphone 100 performs the functions 1716, 1718, and 1720 similar to performing functions 514, 516, and 518 as described above.

FIGS. 20 and 21 illustrate embodiments of the smartphone 100 having alternative antenna array configurations that can be used for sending mutual coupling transmissions that can be used to determine MCVs for detecting object position relative to the antenna arrays, for instance using the methods 1600 and 1700 described above. FIGS. 20 and 21 show the smartphone 100 as including four antenna arrays (one labeled 2006 in FIG. 20 and one labeled 2106 in FIG. 21) near the four corners of the device 100, with each having a similar physical arrangement. The corner antenna arrays each have sixteen active antenna elements. However, in FIG. 21, the antenna elements are rotated 45 degrees from the antenna elements shown in FIG. 20. The corner antenna arrays are positioned equidistant from a hub antenna array 1874 coupled to a transmitter for sending mutual coupling transmissions. The additional antenna elements in the antenna arrays enable one or more benefits similar to those enabled by the antenna array configurations shown in FIGS. 10 through 15. Also, although not shown, the corner antenna arrays shown in FIGS. 20 and 21 can include one or more parasitic antenna elements for enabling low-power mutual coupling transmissions.

FIG. 22 shows a logical flow diagram illustrating a method 2200 for determining object position based on multiple sets of MCVs determined at different times. Namely, the smartphone 100 determines 2204, at an initial time $t_0$, a set of MCVs such as an S-matrix for a plurality of different pairs of antenna arrays of the smartphone 100. The smartphone 100 determines 2206, at a subsequent time $t_1$, another set of MCVs for the plurality of different pairs of antenna arrays.

The smartphone 100 determines 2208 a set of difference values using the two sets of MCVs determined at the different times $t_0$ and $t_1$. For an embodiment, each MCV in the set determined at 2206 has a corresponding MCV in the set determined at 2204. The corresponding MCVs are determined at different times for the same pair of antenna arrays, and the set of difference values include a difference value calculated, for each of the different pairs of antenna arrays, using the corresponding MCVs determined at the different times. The smartphone 100 determines 2210 object, e.g., hand, position based on the set of difference values.

The smartphone 100 can perform the method 2200 in different use case scenarios. For a first use case scenario, the smartphone 100 performs the method 2200 while in an information session such as a voice or data call. In this use case scenario, the smartphone 100 detects 2202 that it is in a call. For example, the smartphone 100 detects 2202 that a user has initiated a voice call to an external device and then performs functions 2204, 2206, 2208, and 2210 as described to detect an initial hand position. The smartphone 100 configures 2212 its antenna arrays based on the hand position while the device is in the call. The smartphone 100 can, thus, optimize a communication link over which communication transmissions are exchanged with the external device.

The smartphone 100 continues to performs blocks 2206, 2208, 2210, and 2212 as long as the smartphone 100 detects 2214 that the call is ongoing. Otherwise, the smartphone ends 2216 the method 2200. In this manner, the smartphone 100 repetitively determines first (previous) and second (current) sets of MCVs and a corresponding set of difference values to track or monitor the user's hand movement over time to continue to optimize the communication link by re-configuring its antenna arrays based on the hand motion.

For a second use case scenario, the smartphone 100 opens, closes, or operates a context dependent application, such as a gesture detection application, in response to a user's hand movement as determined by the method 2200. For an example, the smartphone 100 performs functions 2204, 2206, 2208, and 2210 once or performs the functions 2206, 2208, and 2210, multiple times to detect an initial hand position or a series of hand movements used to open or begin using 2218 a gesture detection application. If the smartphone 100 detects 2220 that the application was disabled or closed at 2218, the smartphone 100 ends 2216 the method 2200. Otherwise, the smartphone 100 continues to perform functions 2206, 2208, 2210, to track the user's hand movement relative to the smartphone 100, namely relative to the plurality of antenna arrays, to operate 2218 the context dependent application, e.g., to continue to interpret hand gestures from the hand movement.

FIG. 23 shows a logical flow diagram illustrating an embodiment of a method 2300 that can be performed by the smartphone 100 for determining object position based on multiple sets of MCVs determined at different times. The method 2300 is also described with reference to FIGS. 6, 7, 8, and 9. The smartphone 100 can perform the method 2300 once to determine object, e.g., hand, position. Alternatively, the smartphone 100 performs at least portions of the method 2300, e.g., blocks 2302, 2304, 2306, 2308, 2310, 2312, and 2314 to track hand motion over time.

More particularly, using the method 400 for instance, the smartphone 100 sequentially sends 2302 mutual coupling transmissions 634, 636, 638, 640 from antenna elements 2, 4, 6, and 8, respectively. The smartphone 100 measures 2304 the power level of the mutual coupling transmissions 634, 636, 638, and 640 received, respectively, at the antenna elements 1, 3, 5, and 7 from which the smartphone 100 determines and stores 2306 a first set of S-parameters $S_{12}$, $S_{34}$, $S_{56}$, and $S_{78}$. The smartphone 100 waits 2308 a time interval t and performs blocks 2302, 2304, and 2306 to determine and store a second set of S-parameters $S_{12}$, $S_{34}$, $S_{56}$, and $S_{78}$.

The smartphone 100 determines 2310 a set of difference values $\Delta S_{12}$, $\Delta S_{34}$, $\Delta S_{56}$, and $\Delta S_{78}$ between the two sets of stored S-parameters, for instance as illustrated in Table 3 below.

TABLE 3

| BETWEEN ARRAYS 104 & 106 | $\Delta|S_{12}| = |S_{12}|_{t2+1} - |S_{12}|_{t2}$ |
| BETWEEN ARRAYS 104 & 108 | $\Delta|S_{34}| = |S_{34}|_{t4+1} - |S_{34}|_{t4}$ |
| BETWEEN ARRAYS 108 & 110 | $\Delta|S_{56}| = |S_{56}|_{t6+1} - |S_{56}|_{t6}$ |
| BETWEEN ARRAYS 106 & 110 | $\Delta|S_{78}| = |S_{78}|_{t8+1} - |S_{78}|_{t8}$ |

Namely, for each mutual coupling transmission path between a pair of antenna elements, the smartphone 100 determines 2310 the difference between the MCVs determined along that path at the different times.

For example, as shown in Table 3, for the mutual coupling transmission path between antenna arrays 104 and 106, e.g., from antenna element 2 to antenna element 1, the smartphone 100 determines 2310 a difference value, $\Delta|S_{12}|$, for S-parameters taken at different times as $\Delta|S_{12}|=|S_{12}|_{t2+1}-|S_{12}|_{t2}$. For this equation, t2 indicates the first instance when the antenna element 2 sends the mutual coupling transmission 634 to the antenna element 1 from which $S_{12}$ is measured, and t2+1 indicates the second instance when the antenna element 2 sends the mutual coupling transmission 634 to the antenna element 1 from which $S_{12}$ is measured. Similarly, the smartphone 100 determines: $\Delta|S_{34}|$ for the antenna array pair 104 and 108 from $S_{34}$ measured from the mutual coupling transmission 636 sent at times t4 and t4+1; $\Delta|S_{56}|$ for the antenna array pair 108 and 110 from $S_{56}$ measured from the mutual coupling transmission 638 sent at times t6 and t6+1; and $\Delta|S_{78}|$ for the antenna array pair 106 and 110 from $S_{78}$ measured from the mutual coupling transmission 640 sent at times t8 and t8+1.

The smartphone 100 determines 2312, whether any of the deltas (magnitudes) $\Delta S_{12}$, $\Delta S_{34}$, $\Delta S_{56}$, or $\Delta S_{78}$ exceed a threshold value. If none of the deltas exceeds the threshold value, the smartphone 100 proceeds to block 2302, in one embodiment, to determine at least one other S-matrix from which to determine the set of difference values $\Delta S_{12}$, $\Delta S_{34}$, $\Delta S_{56}$, and $\Delta S_{78}$. For one implementation, the smartphone 100 determines two new sets of S-parameters at two different times for calculating the deltas. For an alternative implementation, the smartphone 100 determines one new set of S-parameters and uses the other most recently determined set of S-parameters for calculating the deltas.

If, however, the smartphone 100 determines 2312 that one or more of the deltas $\Delta S_{12}$, $\Delta S_{34}$, $\Delta S_{56}$, or $\Delta S_{78}$ exceeds the threshold value, the smartphone 100 identifies 2314 the corresponding antenna array pair as being shadowed by an object, e.g. a hand, at or near the position of the pair of antenna arrays. For example, if the smartphone 100 determines 2312 that only $\Delta S_{34}$ exceeds the threshold value, the smartphone 100 correspondingly determines 2314 that the hand is positioned somewhere at or between or on the antenna arrays 104 and 108.

Once the smartphone 100 determines 2314 the hand position relative to the antenna arrays 104, 106, 108, 110, the smartphone 100 configures the antenna arrays based on the hand position. For an embodiment, the smartphone 100 can perform one or a combination of the following operations based on the hand position: operating 2316 a shadowed antenna element of a first millimeter-wave antenna array and a shadowed antenna element of a second millimeter-wave antenna array for a mutual coupling transmission; operating 2316 an un-shadowed first sub-array of the first millimeter-wave antenna array for communication transmissions; deactivating 2316 a shadowed second sub-array of the second millimeter-wave antenna array. The smartphone 100 can further deactivate 2318 one or more shadowed sub-6 GHz antenna elements based on the hand position or inform 2320 an application processor about the hand position to open, close, or operate one or more context aware applications. For one example implementation, the smartphone 100 performs the functions 2316, 2318, and 2320 similar to performing functions 514, 516, and 518 as described above.

In the foregoing specification, specific embodiments have been described. However, one of ordinary skill in the art appreciates that various modifications and changes can be made without departing from the scope of the material as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The embodiments are defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    determining a first set of mutual coupling values for a first millimeter-wave antenna array and a second millimeter-wave antenna array of a plurality of multi-element, millimeter-wave antenna arrays of an electronic communication device, each multi-element, millimeter-wave antenna array comprising a distinct set of antenna elements, wherein each mutual coupling value indicates mutual coupling transmission efficiency between antenna elements of a respective pair of antenna arrays;
    determining an object position relative to the plurality of antenna arrays based on the first set of mutual coupling values;
    operating, based on the object position, a shadowed antenna element of the first millimeter-wave antenna array and a shadowed antenna element of the second millimeter-wave antenna array for a mutual coupling transmission;
    operating, based on the object position, an un-shadowed first sub-array of the first millimeter-wave antenna array for communication transmissions, the first sub-array comprising at least two antenna elements of the first millimeter-wave antenna array; and
    deactivating, based on the object position, a shadowed second sub-array of the second millimeter-wave antenna array, the second sub-array comprising at least two antenna elements of the second millimeter-wave antenna array.

2. The method of claim 1 further comprising deactivating at least a shadowed portion of a sub-6 GHz antenna array of the plurality of antenna arrays based on the object position.

3. The method of claim 1, wherein determining the first set of mutual coupling values comprises determining a plurality of scattering parameters indicating power transferred for mutual coupling transmissions between antenna elements of multiple pairs of the plurality of antenna arrays.

4. The method of claim 1 further comprising determining a plurality of difference values each indicating a difference calculation between a different pair of mutual coupling values of the first set of mutual coupling values, wherein the plurality of difference values is used to determine the object position relative to the plurality of antenna arrays.

5. The method of claim 1, further comprising: comparing the first set of mutual coupling values with a set of reference coupling values to determine the object position relative to the plurality of antenna arrays.

6. The method of claim 5, further comprising: determining a hand-grip relative to the electronic communication device based on the object position.

7. The method of claim 1, further comprising:
    determining multiple mutual coupling values based on contemporaneous mutual coupling transmissions between antenna elements of different pairs of the plurality of multi-element, millimeter-wave antenna arrays, wherein each contemporaneous mutual coupling transmission occurs at a different transmission frequency.

8. The method of claim 1, further comprising:
    determining multiple mutual coupling values based on sequential mutual coupling transmissions between antenna elements of different pairs of the plurality of multi-element, millimeter-wave antenna arrays.

9. The method of claim 1, wherein the first set of mutual coupling values comprises a plurality of mutual coupling values determined for a plurality of different pairs of antenna arrays, the method further comprising:
    determining a second set of mutual coupling values for the plurality of different pairs of antenna arrays;
    determining a set of difference values between the second and first sets of mutual coupling values to determine object position relative to the plurality of antenna arrays.

10. The method of claim 9, wherein each mutual coupling value in the second set has a corresponding mutual coupling value in the first set determined at a different time for the same pair of antenna arrays, wherein the set of difference values comprises a difference value calculated, for each of the different pairs of antenna arrays, using the corresponding mutual coupling values determined at the different times.

11. The method of claim 10, wherein determining object position relative to the plurality of antenna arrays comprises determining, based on the set of difference values, a hand movement relative to the electronic communication device.

12. The method of claim 11 further comprising opening, closing, or operating a context dependent application in response to the hand movement.

13. The method of claim 11 further comprising:
 detecting that the electronic communication device is in an information exchange session;
 repetitively determining first and second sets of mutual coupling values and a corresponding set of difference values to track the hand movement during the information exchange session.

14. An electronic communication device comprising:
 multiple multi-element, millimeter wave antenna arrays, with each antenna array comprising a distinct set of antenna elements, with each antenna element operative to exchange a mutual coupling transmission with another antenna array element;
 a processor, operatively coupled to the multiple antenna arrays, the processor operative to:
  determine a set of mutual coupling values for mutual coupling transmissions sent between different pairs of the multiple antenna arrays, wherein each mutual coupling value indicates mutual coupling transmission efficiency between antenna elements of a respective pair of antenna arrays;
  determine an object position relative to the multiple antenna arrays based on the set of mutual coupling values;
  operate, based on the object position, a shadowed antenna element of a first millimeter-wave antenna array and a shadowed antenna element of a second millimeter-wave antenna array for a mutual coupling transmission;
  operate, based on the object position, an un-shadowed first sub-array of the first millimeter-wave antenna array for communication transmissions, the first sub-array comprising at least two antenna elements of the first millimeter-wave antenna array; and
  deactivate, based on the object position, a shadowed second sub-array of the second millimeter-wave antenna array, the second sub-array comprising at least two antenna elements of the second millimeter-wave antenna array.

15. The electronic communication device of claim 14, wherein each multi-element, millimeter wave antenna array includes a distinct parasitic antenna element.

16. The electronic communication device of claim 14, wherein each multi-element, millimeter wave antenna array includes a set of antenna elements dedicated for mutual coupling transmissions.

17. The electronic communication device of claim 14, wherein each multi-element, millimeter wave antenna array includes a set of antenna elements operable for both mutual coupling transmissions and communication transmissions.

18. An apparatus comprising:
 at least two millimeter-wave antenna arrays, with each antenna array comprising four active antenna elements and two parasitic antenna elements;
 at least one transceiver, operatively coupled to the at least two millimeter-wave antenna arrays;
 a processor, operatively coupled to the at least one transceiver, the processor operative to:
  control the at least one transceiver to initiate mutual coupling transmissions between any two active antenna elements of the at least two millimeter-wave antenna arrays;
  determine a set of mutual coupling efficiency values for the mutual coupling transmissions between antenna elements of the at least two millimeter-wave antenna arrays;
  determine an object position relative to the at least two millimeter-wave antenna arrays based on the set of mutual coupling values;
  operate, based on the object position, a shadowed antenna element of a first millimeter-wave antenna array of the at least two millimeter-wave antenna arrays and a shadowed antenna element of a second millimeter-wave antenna array of the at least two millimeter-wave antenna arrays for a mutual coupling transmission;
  operate, based on the object position, an un-shadowed first sub-array of the first millimeter-wave antenna array for communication transmissions, the first sub-array comprising at least two antenna elements of the first millimeter-wave antenna array; and
  deactivate, based on the object position, a shadowed second sub-array of the second millimeter-wave antenna array, the second sub-array comprising at least two antenna elements of the second millimeter-wave antenna array.

19. The apparatus of claim 18, further comprising:
 at least a second two millimeter-wave antenna arrays, operatively coupled to the at least one transceiver, with each antenna array comprising four active antenna elements and two parasitic antenna elements.

20. The apparatus of claim 19, wherein the apparatus is substantially rectangular and each of a respective one of the at least two millimeter-wave antenna arrays and each of a respective one of the at least a second two millimeter-wave antenna arrays, are positioned substantially near a corner of the substantially rectangular apparatus.

* * * * *